US007580893B1

(12) United States Patent
Suzuki

(10) Patent No.: US 7,580,893 B1
(45) **Date of Patent: *Aug. 25, 2009**

(54) ACOUSTIC SIGNAL CODING METHOD AND APPARATUS, ACOUSTIC SIGNAL DECODING METHOD AND APPARATUS, AND ACOUSTIC SIGNAL RECORDING MEDIUM

(75) Inventor: Shiro Suzuki, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/412,556

(22) Filed: Oct. 5, 1999

(30) Foreign Application Priority Data

Oct. 7, 1998 (JP) ............................... P10-285624

(51) Int. Cl.
*G06F 21/00* (2006.01)

(52) U.S. Cl. ............................ 705/51; 705/50; 705/52; 705/53; 705/54; 705/55; 705/56; 705/57; 705/58; 705/59; 704/203; 704/207; 704/211

(58) Field of Classification Search ............. 705/50-59; 348/207
See application file for complete search history.

(56) References Cited

U.S. PATENT DOCUMENTS 5,095,392 A * 3/1992 Shimazaki et al. ............ 360/40
5,530,750 A * 6/1996 Akagiri ...................... 704/500
5,654,952 A * 8/1997 Suzuki et al. ............ 369/59.16
5,687,281 A * 11/1997 Beerends et al. ............ 704/203
5,731,767 A * 3/1998 Tsutsui et al. ................. 341/50
5,864,800 A * 1/1999 Imai et al. .................... 704/229
5,901,234 A * 5/1999 Sonohara et al. ............ 381/104
5,978,762 A * 11/1999 Smyth et al. ................ 704/229
6,061,649 A * 5/2000 Oikawa et al. .............. 704/226
6,064,954 A * 5/2000 Cohen et al. ................ 704/207
6,101,314 A * 8/2000 Keesen ....................... 386/124
6,298,361 B1 * 10/2001 Suzuki ....................... 708/313
6,400,996 B1 * 6/2002 Hoffberg et al. .............. 700/83
6,487,535 B1 * 11/2002 Smyth et al. ................ 704/500
6,680,972 B1 * 1/2004 Liljeryd et al. .............. 375/240
6,681,029 B1 * 1/2004 Rhoads ....................... 382/100
6,700,990 B1 * 3/2004 Rhoads ....................... 382/100

OTHER PUBLICATIONS

U.S. Appl. No. 09/013,492, filed Jan. 26, 1998.

* cited by examiner

*Primary Examiner*—Calvin Loyd Hewitt, II
*Assistant Examiner*—Cristina Owen Sherr
(74) *Attorney, Agent, or Firm*—Sonnenschein Nath & Rosenthal LLP

(57) ABSTRACT

Acoustic signal encoder is provided which comprises a subband filter band to divide an original signal into a plurality of frequency bands, a spectrum transformation circuit to detect the amplitude of a signal in each of the plurality of frequency bands in each of sub-blocks resulted by division of a block length for signal coding, process the signal amplitude in each band based on the detected amplitude and transform the signals divided in the frequency bans to spectra, a normalizing circuit and quantizing circuit to normalize and quantize the spectrum, respectively, and a code row generator to generate a code row from the signals processed by the above circuits.

5 Claims, 38 Drawing Sheets

| ORDER OF DETECTIONS | 1 | 2 | 3 | 4 | 5 | 6 |
|---|---|---|---|---|---|---|
| ORDER OF CHANGES | Gb-Ga(-) | Gc-Gb(+) | Gd-Gc(+) | Ge-Gd(+) | Gf-Ge(+) | Gg-Gf(-) |
| ORDER OF CHANGE AMOUNTS | 6 | 3 | 5 | 2 | 4 | 1 |
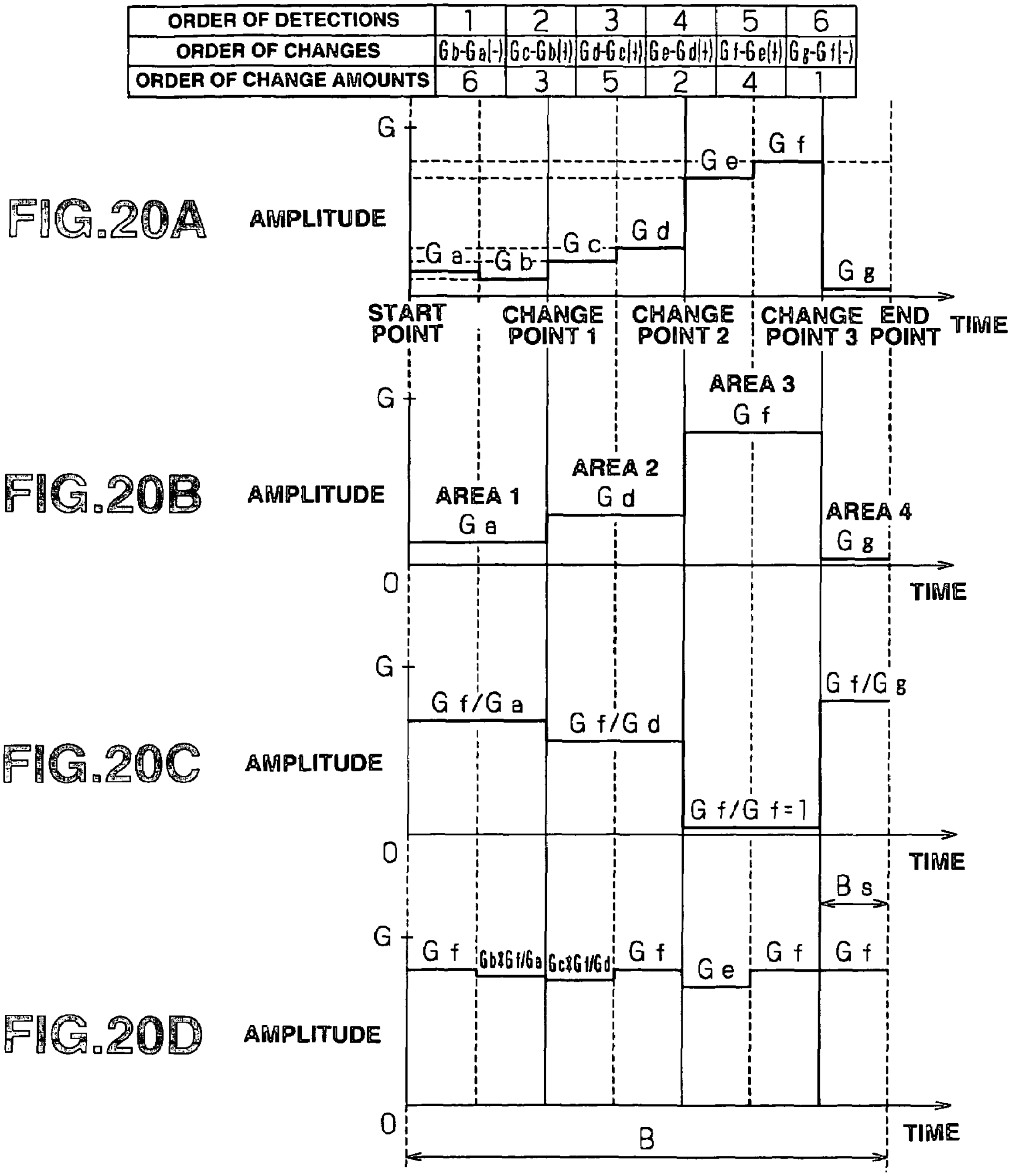

| ORDER OF DETECTIONS | 1 | 2 | 3 | 4 | 5 | 6 |
|---|---|---|---|---|---|---|
| ORDER OF CHANGES | Gb-Ga(-) | Gc-Gb(+) | Gd-Gc(+) | Ge-Gd(+) | Gf-Ge(+) | Gg-Gf(-) |
| ORDER OF CHANGE AMOUNTS | 6 | 3 | 5 | 2 | 4 | 1 |

ACOUSTIC SIGNAL CODING METHOD AND APPARATUS, ACOUSTIC SIGNAL DECODING METHOD AND APPARATUS, AND ACOUSTIC SIGNAL RECORDING MEDIUM

PRIORITY CLAIM

The present application claims priority from Japanese Application No. 10-285624, filed on Oct. 7, 1998, which is hereby incorporated by reference.

BACKGROUND OF THE INVENTION

1. Field of the Invention

The present invention relates to an acoustic signal coding method and apparatus, acoustic signal decoding method and apparatus, and a recording medium having recorded therein programs for the coding and decoding.

2. Description of the Related Art

There have been proposed various methods for highly efficient coding of audio or speech signal, such as a non-blocked frequency band division method called "SBC (subband coding)" in which an audio signal or the like on the time base is coded by dividing the signal into a plurality of frequency bands without blocking it, a blocked frequency band division method called "transform coding" in which a signal on the time base is transformed to a signal on the frequency base (spectrum transform) to divide it into a plurality of frequency bands and thus the signal is coded in each of the frequency bands, etc. Also, a combination of the subband coding and transform coding has been proposed as one of the highly efficient coding methods. In this case, after a signal is divided into frequency bands by the subband coding, for example, the signal in each band is transformed to a signal on the frequency base by the spectrum transform, and coded in each spectrum-transformed band. As a filter used for the frequency band division, QMF (quadrature mirror filter) is available, for example, which is disclosed in "Digital Coding of Speech in Subbands", R. E. Crochiere, Bell Syst. Tech. J. Vol. 55, No. 8, 1976. Also, PQF (polyphase quadrature filter) has been proposed in the disclosure in "Polyphase Quadrature Filters—A New Subband Coding Technique", Joseph H. Rothweiler, IC ASSP 83, Boston.

In the aforementioned spectrum transform, for example, an input audio signal is blocked into frames each of a predetermined unit time, and each blocked signal is subjected to DFT (discrete Fourier transform), DCT (discrete cosine transform), MDCT (modified discrete cosine transform) or the like to transform the time base to a frequency base. The MDCT is known from "Subband/Transform Coding Using Filter Bank Designs Based on Time Domain Aliasing Cancellation", J. P. Princen & A. B. Bradley, ICASSP 1987, Univ. of Surrey Royal Melbourne Inst. of Tech.

By quantizing a signal having been divided in bands by such a filter or spectrum transform, a band where a quantum noise takes place can be controlled, and masking effect or the like can be utilized to attain a higher efficiency of acoustic signal coding and a high acoustic quality of the coded signal. Also, by normalizing a signal with a maximum absolute value, for example, of a component in each band of the signal before quantizing the signal, the signal can be coded with a still higher efficiency.

For quantization of each frequency component resulted from a frequency band division, a division width is selected with the human auditory characteristics taken in consideration. That is, an audio signal is divided into a plurality of bands, for example, 32 bands, each having a bandwidth generally called "critical band" which will be wider as the frequency is higher. Also, data in each band is coded by a predetermined bit assignment to each band or by a bit allocation adaptive to each band. For example, to code an MDCT-processed coefficient data by the bit allocation, an MDCT coefficient data in each band, obtained by the MDCT of each block, will be coded with an adaptive allocated number of bits. For the bit allocation, the following two methods are known.

One of them is known from the IEEE Transactions of Acoustics, Speech, and Signal Processing, Vol. ASSP-25, No. 4, August 1977. In this method, the bit allocation is made based on a signal size in each band. The quantum noise spectrum is flat and noise energy is minimum. Since no masking effect is utilized in this method, however, no optimum acoustic noise reduction can practically be attained. The other method is disclosed in "The critical band coder—digital encoding of the perceptual requirements of the auditory system", M. A. Kransner, ICASSP 1980, MIT. In this method, an auditory masking is utilized to attain a necessary signal-to-noise ratio for each band in order to effect a fixed allocation of bits. However, even when a sine wave input is used in this method to measure a signal-to-noise ratio, not so good a signal-to-noise ratio can be assured since the bit allocation is fixed. To overcome these problems, an highly efficient coding has been proposed in which all bits usable in the bit allocation are allocated depending upon a fixed bit allocation pattern predetermined for each sub-block and also on the signal magnitude in each block and the dependence upon the fixed bit allocation pattern is larger as the signal spectrum is smoother.

The above method permits to remarkably improve, when an energy is concentrated to a specific spectrum such as a sine wave input, the whole signal-to-noise ratio by allocating many bits to a block including the spectrum. Generally, since the human acoustic apparatus is extremely sensitive to a signal having a steep spectrum component, the use of such a method to improve the signal-to-noise ratio will not only improve the numerical value of the measured signal-to-noise ratio but also the quality of a sound to the human auditory organ.

In addition, many other bit allocation methods have been proposed, and the auditory sense model has been more elaborated, so that a higher efficiency of coding and a high acoustic quality of the coded signal can be attained if the capability of an encoder used allows it.

If a signal is decomposed into frequency components once and the frequency components are quantized for coding, a wave signal obtained by decoding and combining the frequency components will incur a quantum noise. However, if the frequency components of the original vary rapidly, the quantum noise in the wave signal will be large even in a portion where the original signal waveform is not large and the quantum noise called "pre/post echo" will not be masked by a simultaneous masking. Thus the quantum noise will be an acoustic disturbance. Especially when a signal is decomposed into many frequency components using the spectrum transform, the time resolution will be worse and thus a large quantum noise will occur for a long period. In this case, reduction of the transformed length of spectrum will shorten also the period for which the quantum noise takes place, which however will make worse the frequency resolution. Thus, the efficiency of coding a quasi-stationary portion will be lower. To solve this problem, a method has been proposed in which the transformed length is reduced at the expense of the frequency resolution of a signal. However, since the transformed length reduction will cause to decrease the number of bits per transformed block, no sufficient accuracy of quantization can be assured so that no good sound quality of the decoded signal can be provided.

To cope with the above problem, it has been proposed to decode and/or code an acoustic time domain signal while a transformed frame length is kept fixed by processing the signal for the amplitude to increase in a micro amplitude zone and then transforming and/or quantizing the signal to a frequency spectrum with the transformed block length kept fixed also when the acoustic time domain signal changes greatly in terms of time in the encoder, and by recording the processed amplitude information in a code row.

In a decoder, the operations effected in the encoder are effected reversely to process, using amplitude controlling information recorded in a code row, the amplitude controlling information of an acoustic time domain signal restored from a frequency spectrum.

By the above processing, it is possible to effectively suppress a pre and/or post echo developed in the micro amplitude zone when the acoustic time domain signal changes greatly within the block. Also, a subband filter can be used to divide the band of an acoustic time domain signal and the amplitude information can be processed in each band, to effectively suppress a pre and/or post echo.

In addition to the pre and/or post echo, however, there are other factors to disturb the auditory sensation. Among others, setting a frame length a little larger in the transform coding will be an acoustic disturbance. The larger the block length, the better the frequency resolution will be and thus the higher the coding efficiency will be. In the case of an original acoustic time domain signal, however, a time domain signal of a specific frequency component developed for a specific limited time will be diffused in a block in a decoded acoustic time domain signal to be an acoustic disturbance. This phenomenon will take place also when an original acoustic time domain signal does not vary greatly in a block, which problem could not be solved by any apparatus adapted to suppress a pre and/or post echo.

OBJECT AND SUMMARY OF THE INVENTION

Accordingly the present invention has an object to overcome the above-mentioned drawbacks of the prior art by providing an acoustic signal coding method and apparatus, an acoustic signal decoding method and apparatus, and a recording medium, adapted to suppress the acoustic disturbance of a time domain signal of a specific frequency component developed for a specific limited time and diffused in a decoded acoustic time domain signal.

The above object can be attained by providing an acoustic signal coding method adapted to code a time domain signal, comprising, according to the present invention, the steps of:

dividing the time domain signal into a plurality of frequency bands;

detecting an amplitude of the time domain signal in each of the plurality of frequency bands in units of sub-block length resulted from division of a block length in which the time domain signal is to be coded;

controlling the amplitude of the time domain signal based on the amplitude controlling information of at least one frequency band detected at the amplitude detecting step;

transforming to a frequency component the time domain signal whose amplitude has been processed at the amplitude controlling step; and normalizing and/or quantizing the frequency component supplied from the frequency component transforming step.

Also the above object can be attained by providing an acoustic signal encoder adapted to code a time domain signal, comprising according to the present invention:

means for dividing the time domain signal into a plurality of frequency bands;

means for detecting an amplitude of the time domain signal in each of the plurality of frequency bands in units of sub-block length resulted from division of a block length in which the time domain signal is ro be coded;

means for controlling the amplitude of the time domain signal based on the amplitude controlling information of at least one frequency band detected by the amplitude detecting means;

means for transforming to a frequency component the time domain signal whose amplitude has been processed by the amplitude controlling means; and means for normalizing and/or quantizing the frequency component from the frequency component transforming means.

Also the above object can be attained by providing an acoustic signal decoding method adapted to process, for a length of each of a plurality of sub-blocks resulted from division of a block length in which a time domain signal has been coded, the amplitude of the time domain signal based on the amplitude controlling information of each of frequency bands into which the time domain signal is divided, then transform the time domain signal to frequency components, code and/or quantize each of the frequency components to provide a row of codes and to decode this code row, comprising, according to the present invention, the steps of:

decomposing the code row;

dequantizing and/or inversely normalizing the signal from the decomposing step to provide frequency components;

combining the frequency components from the dequantizing and/or inversely normalizing step into the time domain signal; and controlling the amplitude of the time domain signal for a length of each of sub-blocks resulted from division of a block length in which the time domain signal combined at the combining step has been coded.

Also the above object can be attained by providing an acoustic signal decoder adapted to process, for a length of each of a plurality of sub-blocks resulted from division of a block length in which a time domain signal has been coded, the amplitude of the time domain signal based on the amplitude controlling information of each of frequency bands into which the time domain signal is divided, then transform the time domain signal to frequency components, code and/or quantize each of the frequency components to provide a row of codes and to decode this code row, comprising according to the present invention:

means for decomposing the code row;

means for dequantizing and/or inversely normalizing the signal supplied from the decomposing means to provide frequency components;

means for combining the frequency components supplied from the dequantizing and/or inversely normalizing means into the time domain signal; and means for controlling the amplitude of the time domain signal for a length of each of sub-blocks resulted from division of a block length in which the time domain signal combined by the combining means has been coded.

Also the above object can be attained by providing a recording medium having recorded therein, according to the present invention, an acoustic signal coding program adapted to code a time domain signal and comprising the processes of:

dividing the time domain signal into a plurality of frequency bands;

detecting an amplitude of the time domain signal in each of the plurality of frequency bands in units of sub-block length resulted from division of a block length in which the time domain signal is to be coded;

controlling the amplitude of the time domain signal based on the amplitude controlling information of at least one frequency band detected at the amplitude detecting step;

transforming to a frequency component the time domain signal whose amplitude has been processed at the amplitude controlling step; and normalizing and/or quantizing the frequency component supplied from the frequency component transforming step.

Also the above object can be attained by providing a recording medium having recorded therein, according to the present invention, an acoustic signal decoding program adapted to process, for a length of each of a plurality of sub-blocks resulted from division of a block length in which a time domain signal has been coded, the amplitude of the time domain signal based on the amplitude controlling information of each of frequency bands into which the time domain signal is divided, then transform the time domain signal to frequency components, code and/or quantize each of the frequency components to provide a row of codes and to decode this code row, the program comprising the processes of:

decomposing the code row;

dequantizing and/or inversely normalizing the signal from the decomposing step to provide frequency components;

combining the frequency components from the dequantizing and/or inversely normalizing step into the time domain signal; and controlling the amplitude of the time domain signal for a length of each of sub-blocks resulted from division of a block length in which the time domain signal combined at the combining step has been coded.

Also the above object can be attained by providing a recording medium having recorded therein, according to the present invention, a code row in which a time domain signal has been coded by an acoustic signal coding method adapted to code the time domain signal and comprising the steps of:

dividing the time domain signal into a plurality of frequency bands;

detecting an amplitude of the time domain signal in each of the plurality of frequency bands in units of sub-block length resulted from division of a block length in which the time domain signal is to be coded;

controlling the amplitude of the time domain signal based on the amplitude controlling information of at least one frequency band detected at the amplitude detecting step;

transforming to a frequency component the time domain signal whose amplitude has been processed at the amplitude controlling step; and normalizing and/or quantizing the frequency component supplied from the frequency component transforming step.

According to the present invention having been summarized in the above, a phenomenon that a frequency component developed for a specific limited time is diffused in a frame can be inhibited by dividing an acoustic time domain signal into a plurality of bands for analysis, detecting the time domain signal of the frequency component developed in the specific limited time and process the amplitude information of the time domain signal with a high accuracy, and thus the frequency resolution can be improved for an improved coding efficiency.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIGS. 20A through 20D show how to reduce amount of information on the amplitude controlling;

DETAILED DESCRIPTION OF THE PREFERRED EMBODIMENTS

The embodiments of the present invention which will be described herebelow include an acoustic signal coding method and apparatus adapted to transform an acoustic signal such as an audio and/or speech signal to a spectrum, and then code it to generate a code row, an acoustic signal decoding method and apparatus adapted to decompose a code row, decode and reconstruct it to a spectrum, and then inversely transform it to an acoustic signal, an acoustic signal coder and/or decoder (will be referred to as "CODEC" hereinafter), and recording media having recorded therein procedures of coding and decoding an acoustic signal, etc.

Figure 1:
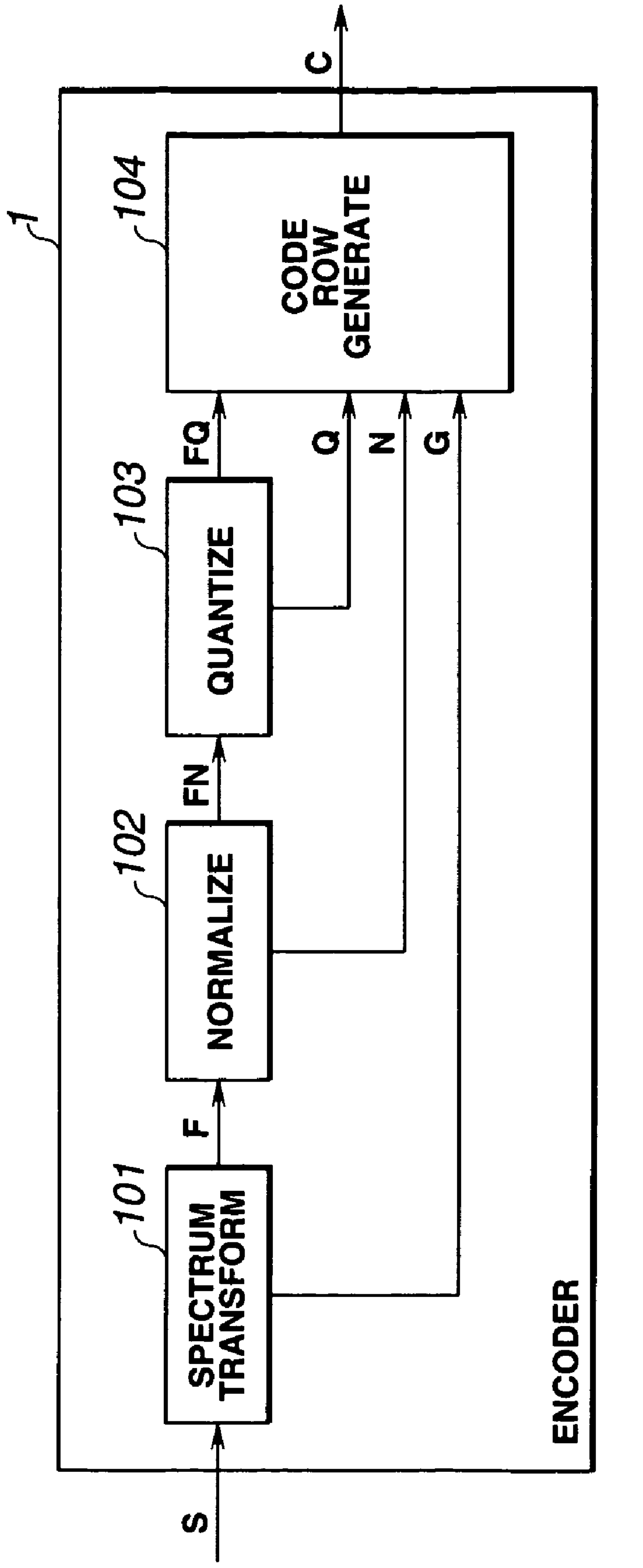
FIG. 1 is a block diagram of an acoustic signal encoder according to the present invention.

Referring now to FIG. 1, there is illustrated in the form of a schematic block diagram an embodiment of the acoustic signal encoder according to the present invention. The acoustic signal encoder is generally indicated with a reference 1.

The acoustic signal encoder 1 comprises a spectrum transformation circuit 101 to process the amplitude of a time domain signal S, generate amplitude controlling information G, and then decompose the time domain signal S to a spectrum F, a spectrum normalization circuit 102 to normalize the spectra F and generate normalization information N, a quantizer 103 to quantize the normalized spectrum FN and generate quantization information Q, and a code row generator 104 to generate a code row C based on the quantized spectrum FQ, amplitude controlling information G, normalization information N and quantization information Q.

The spectrum transformation circuit 101 processes the amplitude of the time domain signal S for entry to the encoder 1, and then decomposes the amplitude to the spectrum F being a frequency component. Further, it supplies the spectrum F to the normalization circuit 102 and the amplitude controlling information G to the code row generator 104.

The normalization circuit 102 normalizes the spectrum F supplied from the spectrum transformation circuit 101, and supplies the normalized spectrum FN to the quantizer 103 and normalization information N to the code row generator 104.

The quantizer 103 quantizes the normalized spectrum FN supplied from the normalization circuit 102, and supplies the quantized spectrum FQ and quantization information Q to the code row generator 104.

The code row generator 104 codes the quantized spectrum FQ supplied from the quantizer 103 based on the amplitude controlling information G from the spectrum transformation circuit 101, normalization information N from the normalization circuit 102 and the quantization information Q from the quantizer 103, and provides a code row C as an output.

Figure 2:
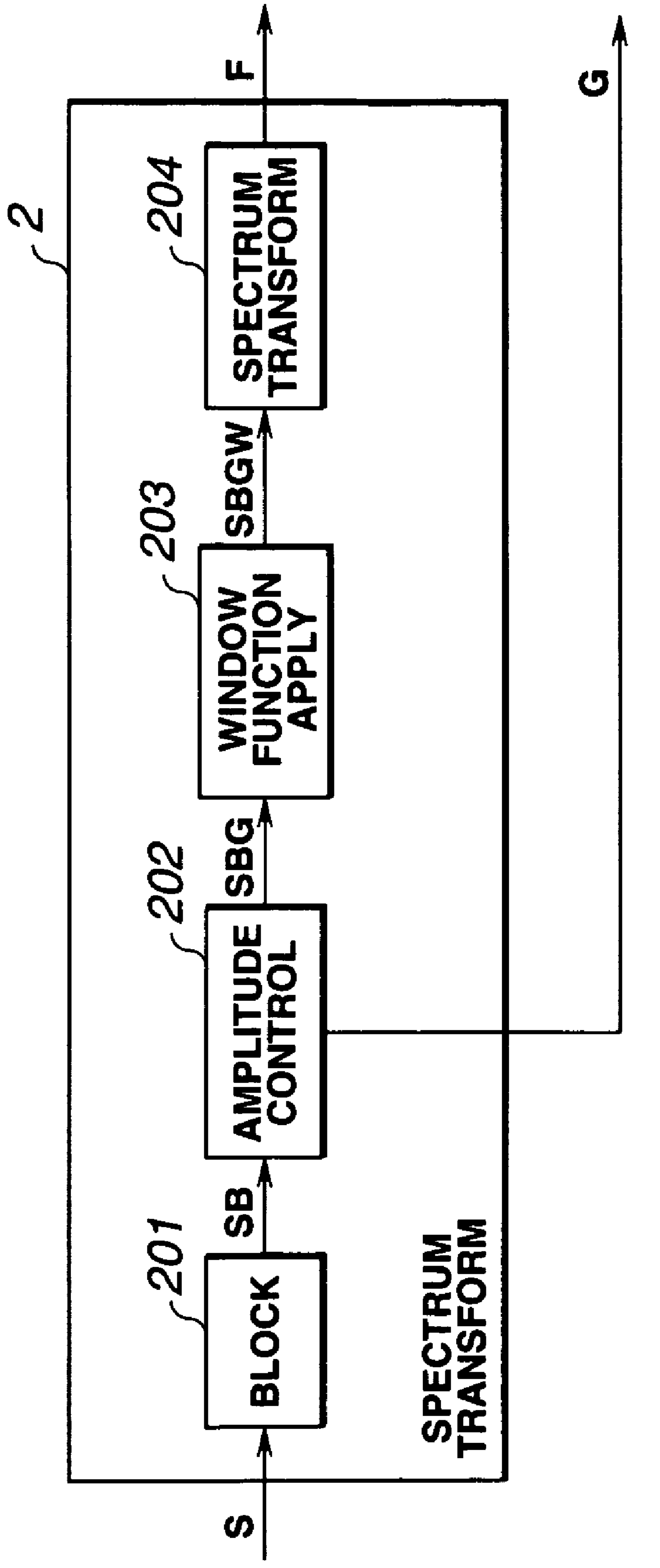
FIG. 2 is a block diagram of a spectrum transformation circuit included in the acoustic signal encoder in FIG. 1.

The spectrum transformation circuit 101 of the encoder 1 can be implemented as a spectrum transformation circuit 2 configured as shown in FIG. 2.

The spectrum transformation circuit 2 comprises a blocking circuit 201 for blocking the time domain signal S supplied to the encoder 1 to provide blocked signals SB, an amplitude controlling circuit 202 for amplitude controlling of the blocked signal SB to provide an amplitude-processed blocked signal SBG and supply the amplitude controlling information G outside of the spectrum transformation circuit 2, a window function application circuit 203 for application of a window function W to the amplitude-processed blocked signal SBG to provide a window function W-applied blocked signal SBGW, and a spectrum transformation circuit 204 for spectrum transformation of the window function W-applied blocked signal SBGW to provide a spectrum F.

The time domain signal S for entry to the spectrum transformation circuit 2 is blocked by the blocking circuit 201 to a time period of a specific length to provide blocked signals SB. The blocked signal SB is controlled in amplitude by the amplitude controlling circuit 202 to provide an amplitude-processed blocked signal SBG for use in the downstream circuitry. The amplitude-processed blocked signal SBG is applied by an appropriate window function W in the window function application circuit 203 for the purpose of improving the frequency resolution to provide a window function W-applied blocked signal SBGW. The window function W-applied blocked signal SBGW is subjected to spectrum transformation in the spectrum transformation circuit 204 to provide a spectrum F.

Figure 3:
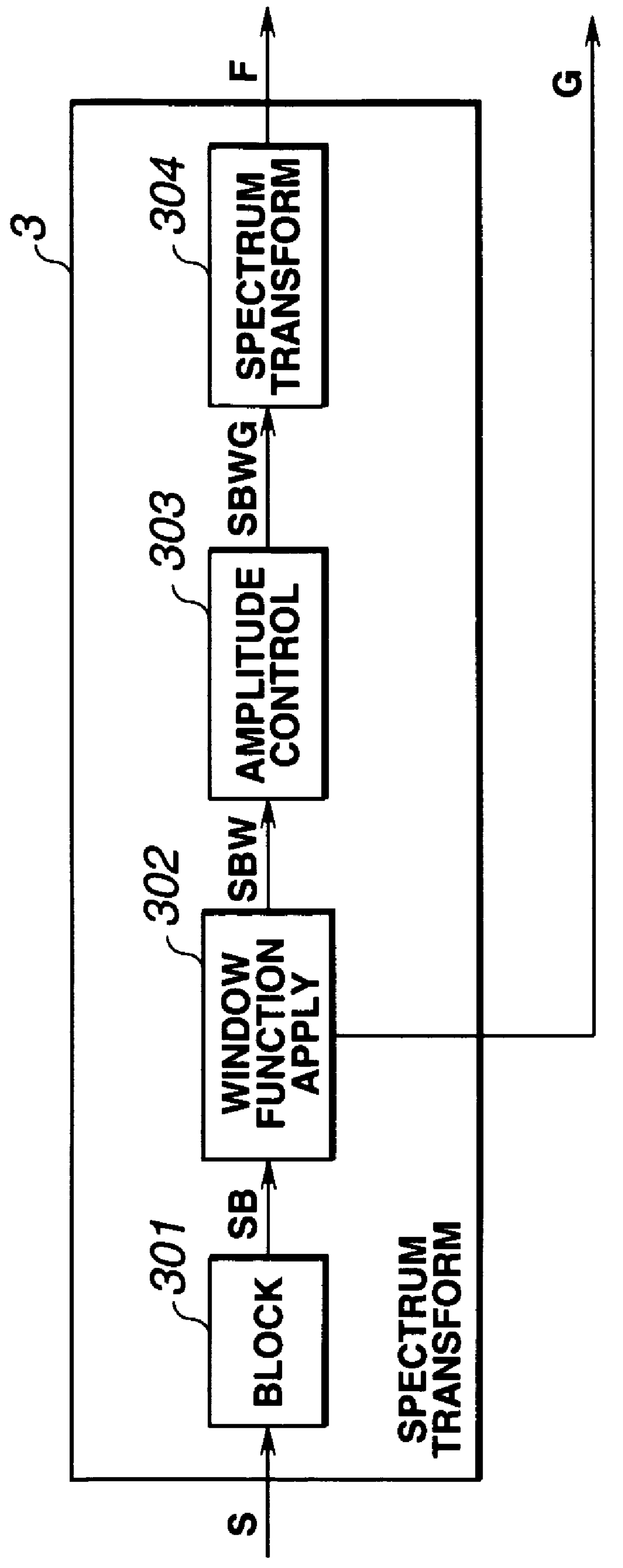
FIG. 3 is a block diagram of a variant of the spectrum transformation circuit in FIG. 2.

The spectrum transformation circuit 101 in the encoder 1 may be configured as a spectrum transformation circuit 3 as shown in FIG. 3.

The spectrum transformation circuit 3 comprises a blocking circuit 301 for blocking the time domain signal S supplied to the encoder 1 to provide blocked signals SB, a window function application circuit 302 to apply a window function W to the blocked signal SB, an amplitude controlling circuit 303 for amplitude controlling of the blocked signal SB to provide an amplitude-processed blocked signal SBW and supply the amplitude controlling information G to outside, and a spectrum transformation circuit 304 for spectrum transformation of the window function W-applied blocked signal SBGW to provide a spectrum F.

The time domain signal S supplied to the spectrum transformation circuit 3 is blocked by the blocking circuit 301 into blocked signals each having a time period of a specific length. The blocked signal SB from the blocking circuit 301 is applied with an appropriate window function W in the window function application circuit 302 to provide a window function W-applied blocked signal SBW which will match blocked signals generated before and after the blocked signal SB. The window function W-applied blocked signal SBW is controlled in amplitude with amplitude controlling information G in the amplitude controlling circuit 303 so that it is used in the downstream circuitry. The amplitude-processed blocked signal SBWG is transformed by the spectrum transformation circuit 304 to provide a spectrum F.

The difference between the spectrum transformation circuit 2 obtained by implementation of the spectrum transformation circuit in the encoder 1 and the spectrum transformation circuit 3 lies in the application of the window function F. That is, the window function F is applied after the amplitude controlling in the spectrum transformation circuit 2, while it is applied before the amplitude controlling in the spectrum transformation circuit 3, as described above. Namely, in the spectrum transformation circuit 2, importance is attached to the matching between blocked signals before and after transformed in spectrum. The amplitude controlling is regarded more important than such matching in the spectrum transformation circuit 3. Therefore, an appropriate window function W can be selected for a one of the spectrum transformation circuits 2 and 3 to be used, and the one thus selected can be used along with the downstream circuitry.

FIGS. 4A through 4G show the operations of the spectrum transformation circuit 3.

Figures 4A, 4B, 4C, 4D, 4E, 4F, 4G:
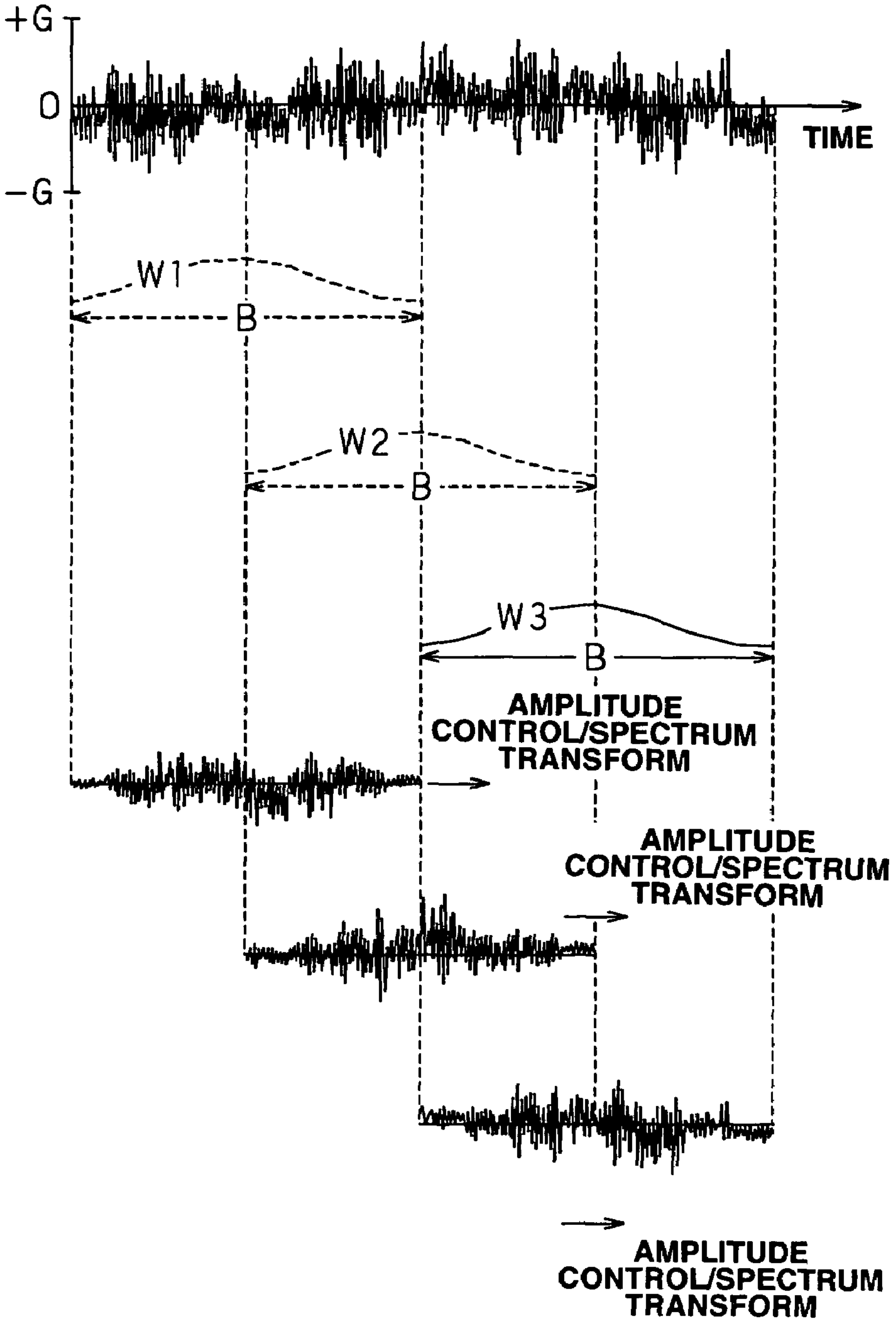
FIGS. 4A through 4G show the operations of the spectrum transformation circuit.

FIG. 4A shows an original signal S, namely, a time domain signal. The original signal S is divided to blocks B each of a constant time period. A half of each block B is shared between the other blocks B preceding and following the block B in consideration. Namely, the latter half of the time period of a window function W1 shown in FIG. 4B is identical to the former half of the time period of a window function W2 shown in FIG. 4C. Also, the latter half of the time period of the window W2 is identical to the former half of the time period of a window function W3 shown in FIG. 4D. These window functions W1 to W3 equalize a composite amplitude of the common areas to the amplitude of the original signal S. The window functions W1 to W3 are applied to provide a blocked signal SBW1 shown in FIG. 4E, a blocked signal SBW2 shown in FIG. 4F and a blocked signal SBW3 shown in FIG. 4G. Each of these blocks is controlled in amplitude with the amplitude controlling information G to transform the spectrum F. The blocked signal SBW will be referred to as "SB" hereinafter for the simplicity of illustration and description.

Figure 5A:
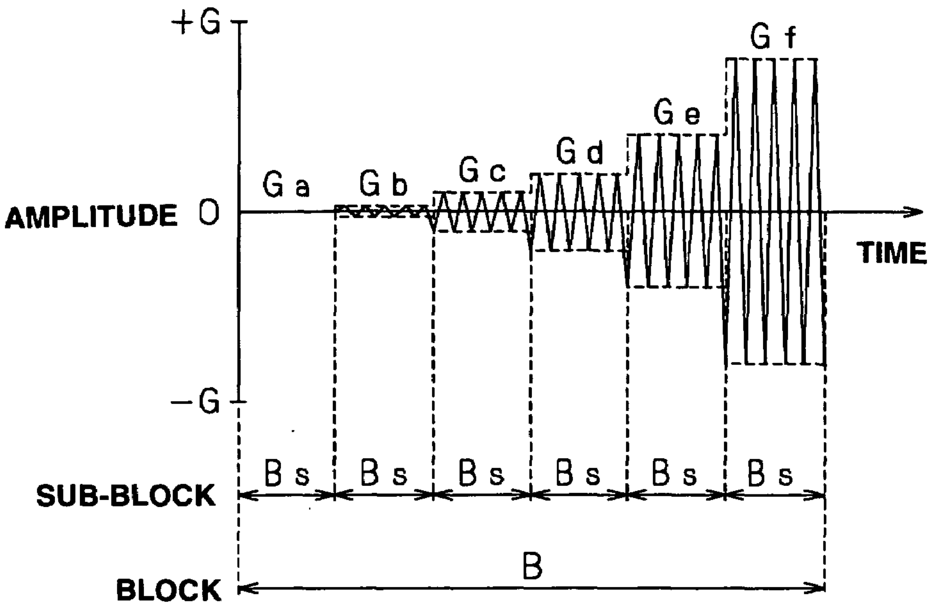
FIGS. 5A and 5B explain problems encountered in transformation of a blocked signal without amplitude controlling thereof.
Figure 5B:
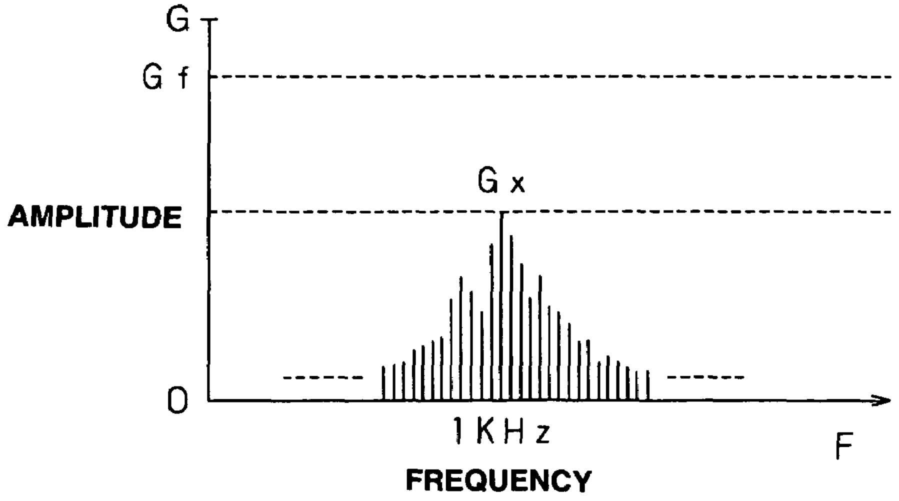

Referring now to FIGS. 5A and 5B and subsequent Figures, there will be explained problems encountered in transformation of a blocked signal SB without amplitude controlling thereof.

For explanation of a technology used to process an acoustic signal as will be described later, FIGS. 5A and 5B show the waveform processing of the original signal SB being a blocked signal having a convenient characteristic for understanding the technology.

The blocked signal SB has a fixed frequency of 1 kHz and only the amplitude hereof changes in every specific areas. To detect the signal amplitude, each of small areas of one signal block B is divided into smaller blocks called sub-blocks Bs for the purpose of analysis. In FIG. 5A, it is assumed that the amplitude of the blocked signal SB changes in every sub-blocks Bs.

As aforementioned, the blocked signal SB has a fixed frequency but changes in amplitude at every sub-blocks Bs. For spectrum transformation of this blocked signal SB, however, the distribution of the spectrum F obtained by the spectrum transformation is such that the maximum amplitude is at 1 kHz as shown in FIG. 5B and also other frequency components are included, thus the signal cannot be coded with a high efficiency.

Figure 6A:
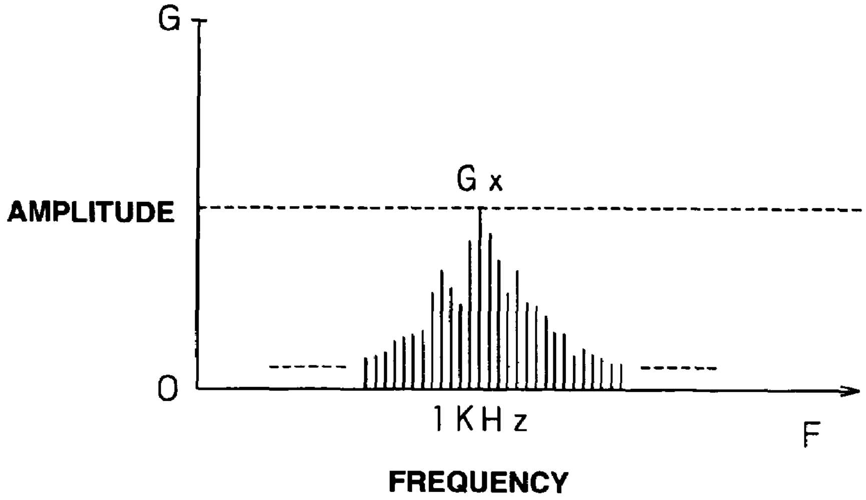
FIGS. 6A and 6B explain how to transform a spectrum component back to a blocked signal by inverse spectrum transform.
Figure 6B:
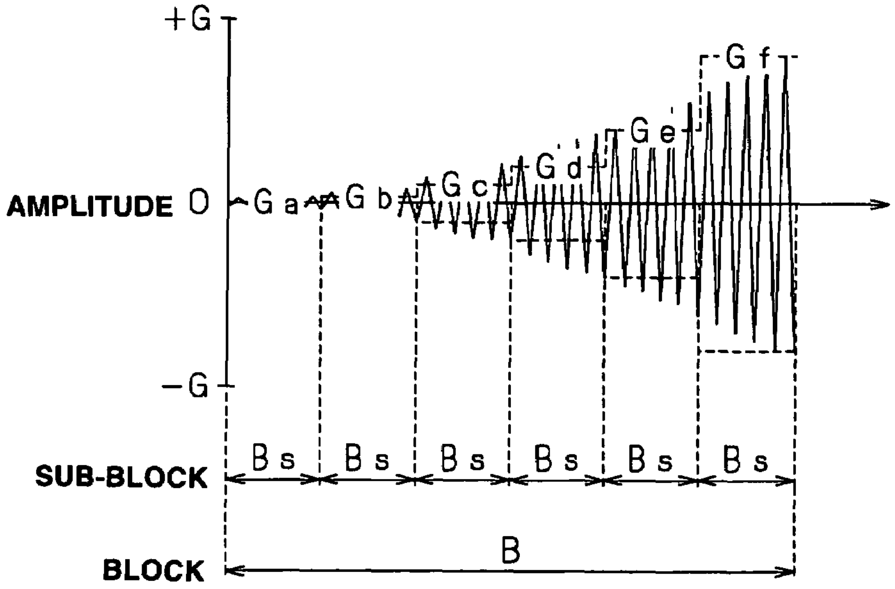

Next, restoration of the spectrum components F to the blocked signal SB by inverse spectrum transformation will be considered below with reference to FIGS. 6A and 6B. In this case, the original signal S should be able to be restored by the inverse spectrum transformation of the amplitude characteristic shown in FIG. 6A. However, if a coded and/or decoded spectrum with no sufficient accuracy of normalization and/or quantization is inversely transformed, there will result a restored signal SB' whose amplitude change is flat as shown in FIG. 6B. It is empirically known that such a change of signal waveform will disturb the auditory sensation. A countermeasure is required to avoid the signal waveform change in question.

Figure 7A:
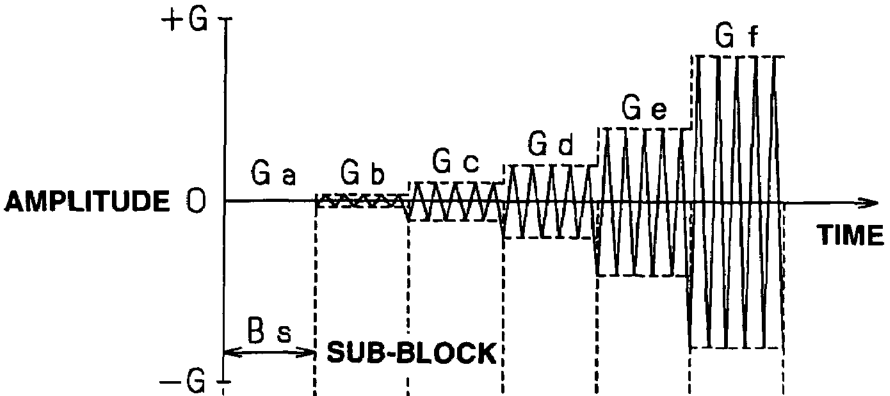
FIGS. 7A and 7B explain how a bit length in which spectrum is to be transformed is changed from a length of a block to that of a sub-block.
Figure 7B:
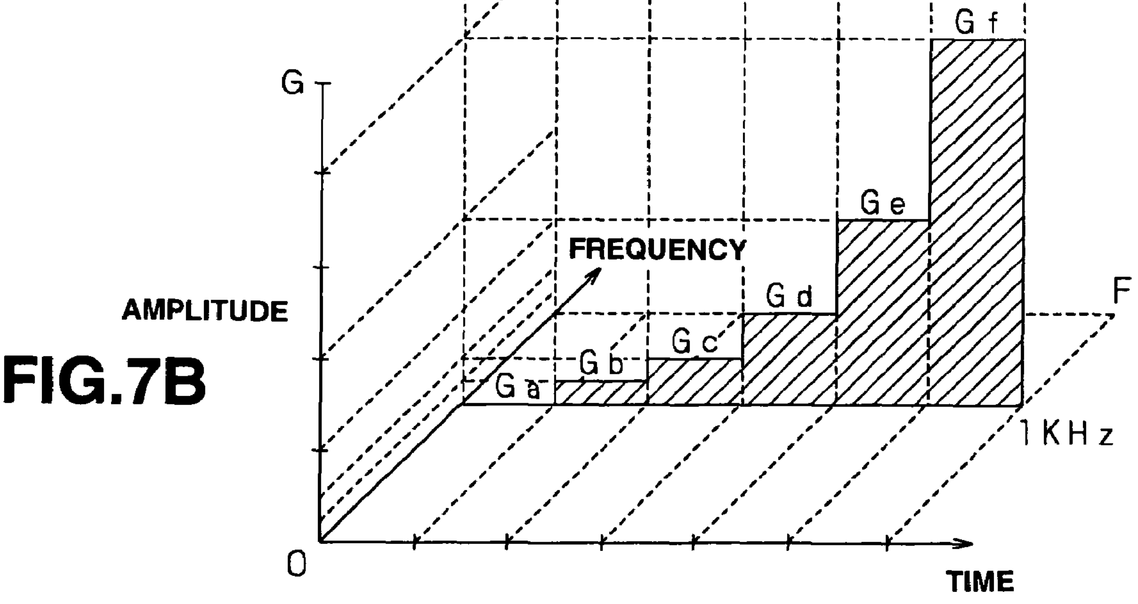

If the block length within which the spectrum transformation is to be done is changed from the length of the block B to that of sub-block Bs, the ideal amplitude characteristic resulted from spectrum transformation of the original signal in FIG. 7A will be that shown in FIG. 7B, which means that if spectrum transformation is done of each sub-block in which the amplitude does not vary, the spectral component will be only 1 KHz at any time.

In this case, if matching of the sub-block with sub-blocks preceding and following the sub-block in consideration is perfect, the coding can be done with a drastically improved efficiency and the amplitude change is stored with a high accuracy. However, since means for changing a block length within which amplitude transformation is to be done has to be provided, it will add to the scale and complexity of the encoder. Along with the division of block length, a bit quantity for one sub-block will also be divided, which will considerably decrease the bits allocated within a transformed block going to be coded with a high efficiency, so that the bit allocation algorithm will be complicated and difficult.

Figure 8:
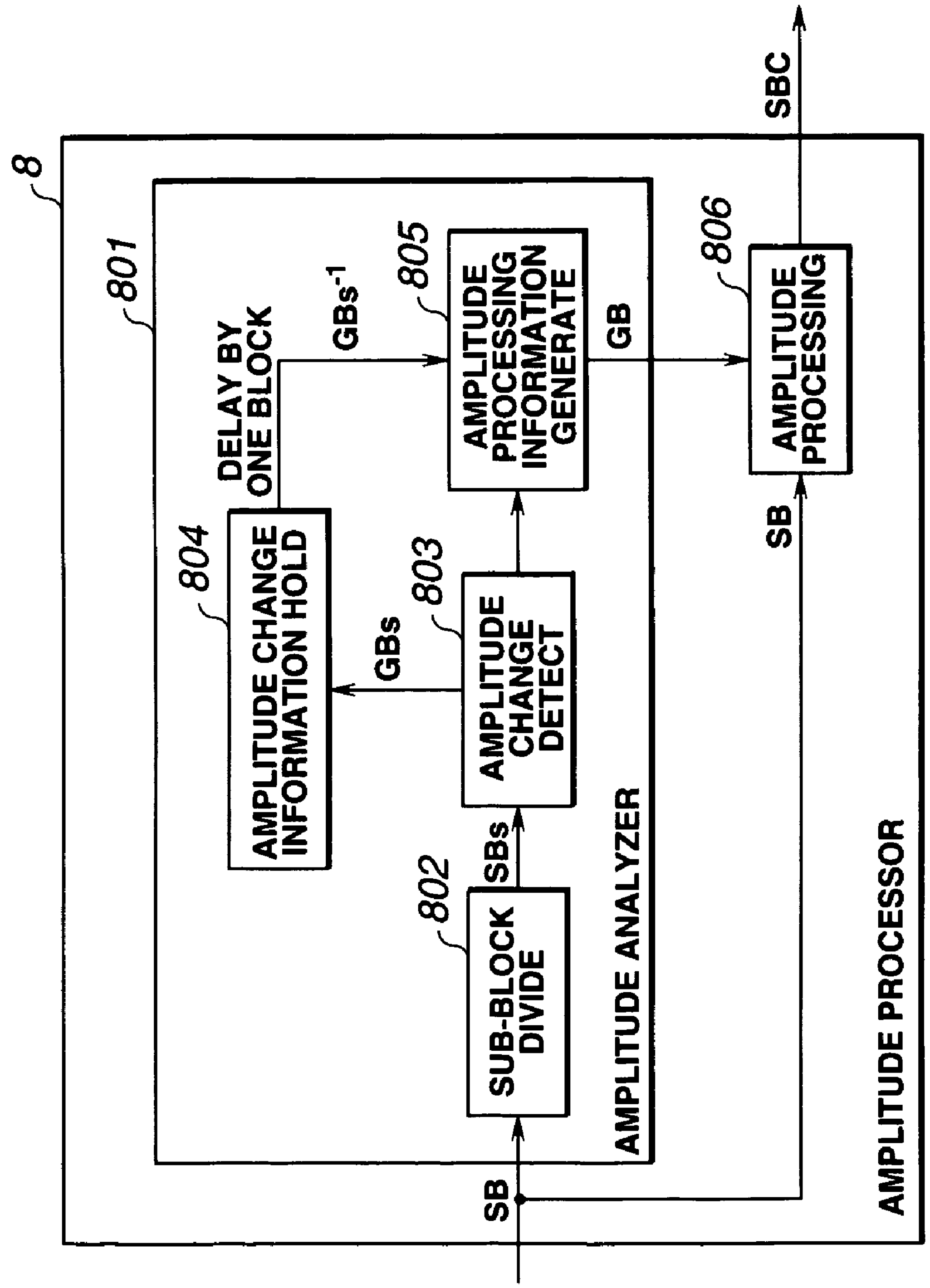
FIG. 8 is a block diagram of an amplitude controlling circuit.

In this embodiment, the signal amplitude within the block B is processed to be constant with the block B kept constant. An amplitude processor used for this amplitude controlling is configured as shown in FIG. 8. The amplitude processor is generally indicated with a reference 8.

As shown, the amplitude processor 8 comprises an amplitude analysis circuit 801 to analyze the amplitude of a supplied blocked signal SB and provide amplitude controlling information GB, and an amplitude controlling circuit 806 to produce and provide amplitude controlling information SBG based on the blocked signal SB and amplitude controlling information GB. In the amplitude processor 8, the blocked signal SB is divided into two, one of which is analyzed in amplitude by the amplitude analysis circuit 801 to provide amplitude controlling information.

The amplitude analyzer 801 comprises a sub-block divider 802 to divide the blocked signal SB into signal sub-blocks SBs, an amplitude change detector 803 to detect amplitude information GBs of each of the signal sub-blocks SBs, an amplitude change information holder 804 to hold amplitude controlling information GBs-1 of a sub-block of a preceding block, and an amplitude controlling information generator 805 to generate amplitude controlling information GB from the amplitude information GBs and GBs-1.

The blocked signal SB supplied to the amplitude analysis circuit 801 is divided into signal sub-blocks SBs by the sub-block divider 802. The signal sub-blocks SBs from the sub-block divider 802 are supplied to the amplitude change detector 803 which detects and provide amplitude information GBs to the amplitude change information holder 804 and amplitude controlling information generator 805. The amplitude change information holder 804 delays, by one block, the amplitude information GBs from the amplitude change detector 803. The amplitude controlling information generator 805 produces an amplitude controlling information GB based on the amplitude information GBs from the amplitude change detector 803 and the amplitude information GBs-1 supplied from the amplitude change information holder 804 and delayed one block.

The amplitude processor 8 further comprises an amplitude processor 806 to actually process the blocked signal SB based on the amplitude controlling information GB from the amplitude controlling information generator 805 and provide an amplitude controlling signal SGB.

The amplitude controlling information generator 805 detects the amplitude of each sub-block to produce the amplitude controlling information GB. However, since the amplitude of each sub-block is discretely processed, the Gibbs' phenomenon will possibly arise to worsen the frequency resolution, transitional periods are set in the flow of amplitude controlling as shown in FIG. 9A.

Figure 9A:
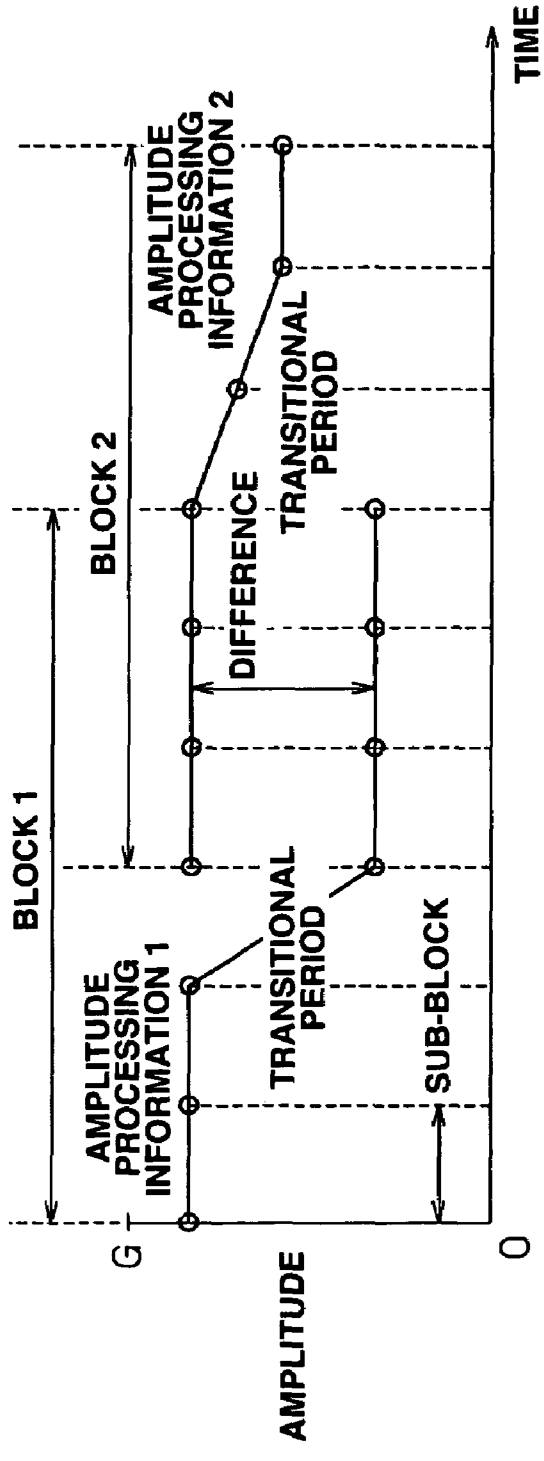
FIGS. 9A and 9B shows how to set transitional periods in a process of amplitude controlling.
Figure 9B:
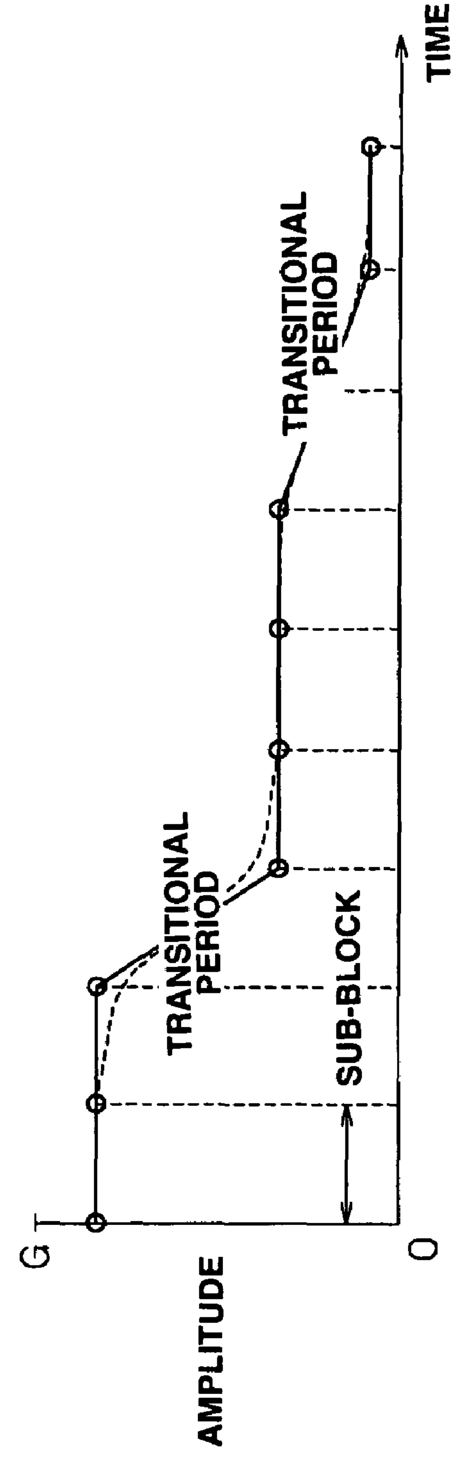

For matching of a blocked signal with those preceding and following the blocked signal, a difference between an amplitude controlling information I of a block I and an amplitude controlling information 2 of a block 2 at the connection between them is eliminated as shown in FIG. 9A, and thus the blocked signal is equalized in amount of amplitude controlling to those preceding and following the blocked signal as indicated with a solid line in FIG. 9B. Also in this case, the amplitude is processed for each sub-block. For connection of the amplitude controlling information of one sub-block with that of another sub-block, the amplitude controlling information should preferably be interpolated with a smooth curve as shown with a dashed line rather than with a linear interpolation indicated with a solid line in FIG. 9B, which enables to suppress the Gibbs's phenomenon arising due to the discrete amplitude controlling.

Referring now to FIGS. 10A through 10D, there is illustrated a concrete example of the practical amplitude controlling.

Figure 10A:
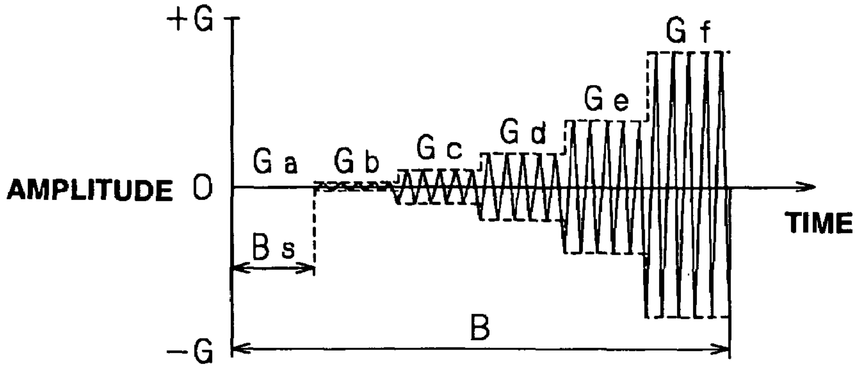
FIGS. 10A through 10D show a concrete example of practical amplitude controlling.

FIG. 10A shows an original signal which is the same as that in FIG. 5A. This signal is to be controlled in amplitude under the assumption that only one block B is controlled in amplitude for the simplicity of the illustration and explanation and the amount of amplitude controlling changes constantly in every sub-blocks Bs. Namely, it should be noted that an amplitude change is discretely detected at every sub-blocks Bs as shown in FIG. 10A.

Figure 10B:
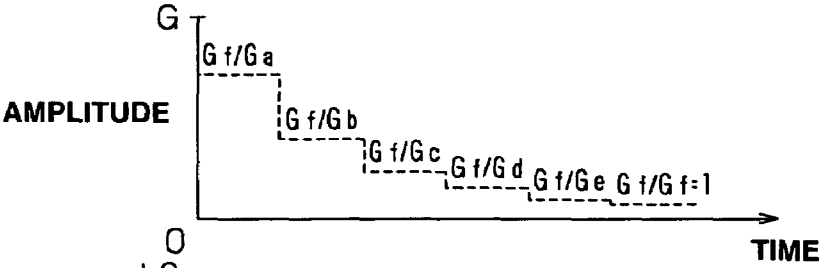

As shown in FIG. 10A, the amplitude of the original signal gradually increases in the direction of Ga, Gb, Gc, Gd, Ge and Gf in each of the sub-blocks Bs. To keep this amplitude constant in the block B, an amplitude controlling information is produced by the amplitude controlling information generator as shown in FIG. 10B.

To keep constant the amplitude in the block B, an amount of amplitude controlling is determined to be Gf/Ga, Gf/Gb, Gf/Gc, Gf/Gd, Gf/Ge and Gf/Gf=1 for the amplitude controlling information thus generated. The original signal in FIG. 10A is controlled in amplitude by the amplitude processor to provide a signal shown in FIG. 10C.

Figure 10C:
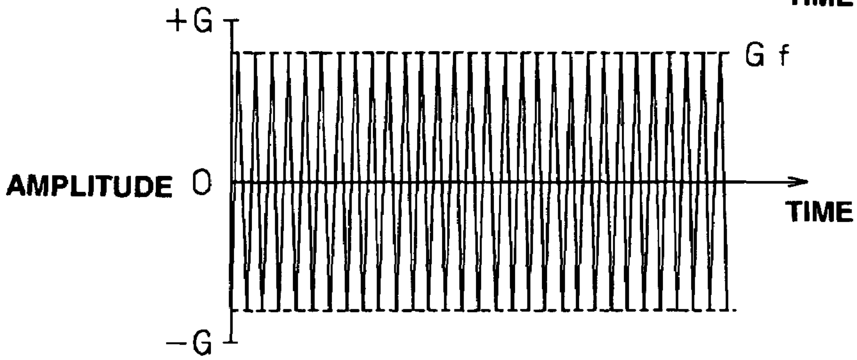
Figure 10D:
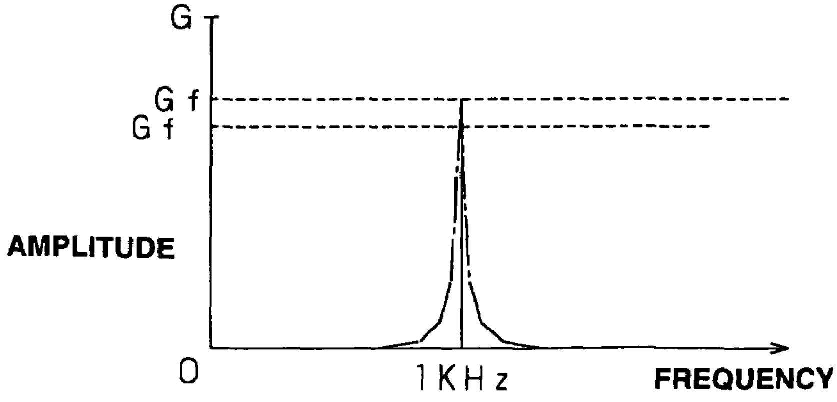

FIG. 10C shows a signal having an amplitude Gf and a frequency of 1 kHz. An ideal amplitude characteristic would be a single spectrum of the amplitude as indicated with a solid line shown in FIG. 10D. Since the block B has a finite length, however, the actual amplitude characteristic is a somewhat widened distribution as indicated with a dashed line in FIG. 10D. In comparison with the amplitude characteristic shown in FIG. 5B, the signal can be coded with a higher efficiency.

Figure 11A:
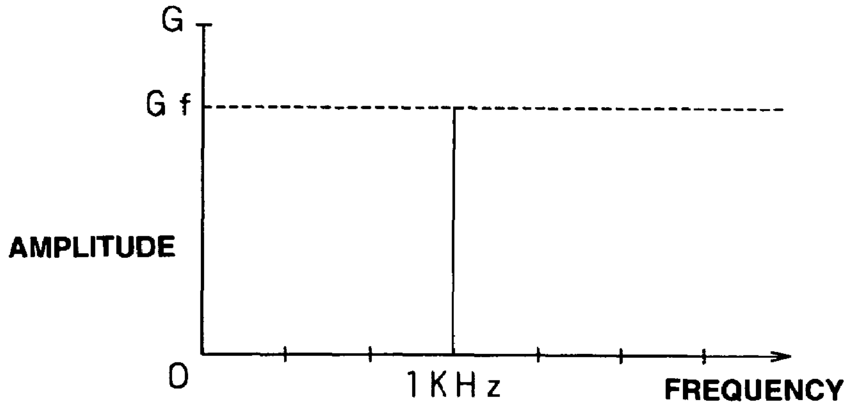
FIGS. 11A through 11D show a concrete example of single-spectrum amplitude controlling.
Figure 11B:
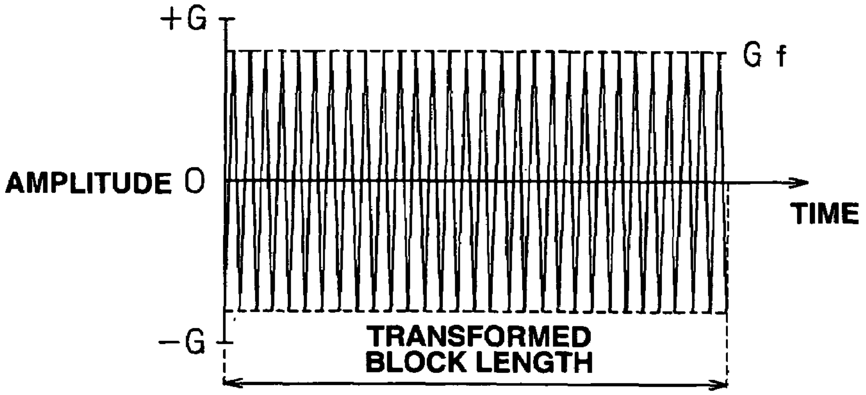

On the assumption that the amplitude characteristic shown in FIG. 10A is a result of an ideal spectrum transformation to provide a single spectrum as shown in FIG. 11A, the single spectrum is inversely transformed to provide a signal having a constant amplitude Gf as shown in FIG. 11B.

Figure 11C:
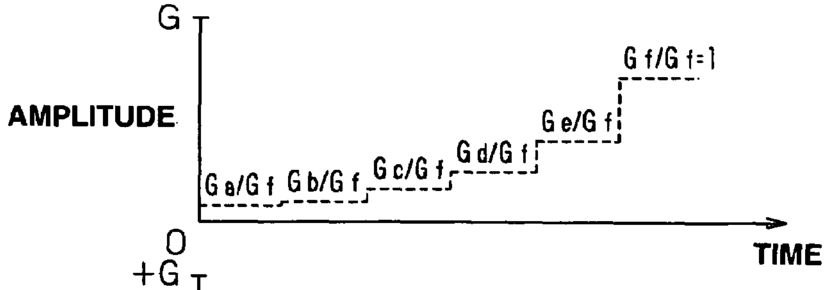
Figure 11D:
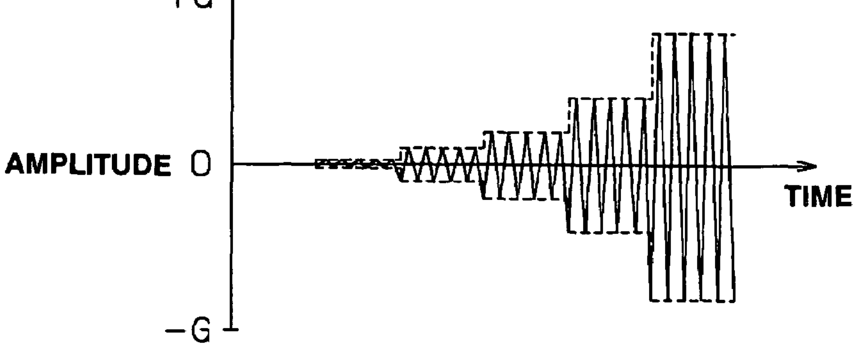

An inverse amplitude controlling as in FIG. 11C of the signal in FIG. 11B, in which the amplitude controlling in FIG. 11B having been done before the spectrum transformation is reversely effected, will provide a restored signal as in FIG. 11D. In comparison with the restored signal SB' shown in FIG. 6B, the restored signal shown in FIG. 11D is more faithful to the original signal in FIG. 10A.

By amplitude controlling of the signal before transformed in spectrum and after inversely transformed in spectrum in the above-mentioned manner, it is possible to code a signal waveform with a high efficiency and high accuracy. Thus, it is possible to minimize an amplitude change within a signal band, which will possibly be an acoustic disturbance.

In the foregoing, the present invention has been described concerning the acoustic signal coding under the ideal conditions in which only a single frequency is involved. Now, the present invention will be described concerning general practical examples of acoustic signal coding.

Figure 12A:
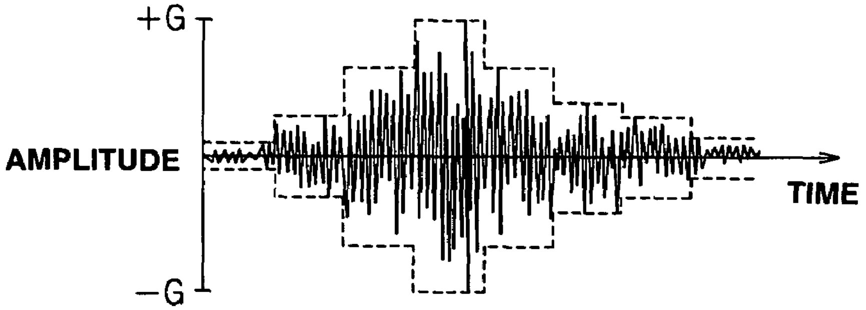
FIGS. 12A and 12B show a concrete example of processing of an amplitude containing a plurality of frequencies.
Figure 12B:
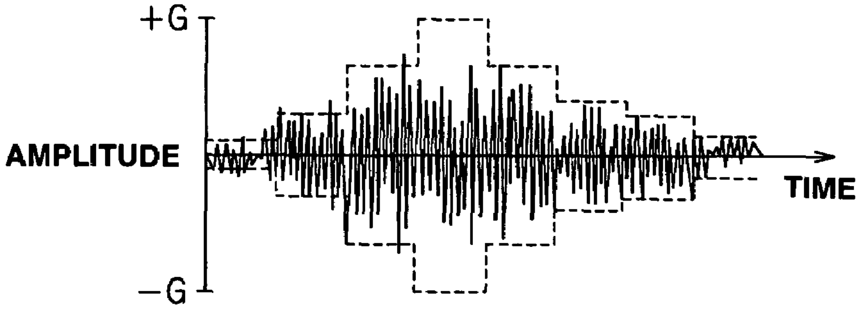

FIG. 12A shows a signal having a variety of frequency components. Coding and/or decoding of the signal will result in a phenomenon that the signal waveform changes as shown in FIG. 12B. Such an amplitude change of the signal will be an acoustic disturbance.

The cause of the amplitude change of the signal before coded and after decoded, as shown in FIGS. 12A and 12B, can be analyzed in detail by dividing the original signal into some frequency bands. By dividing, for analysis, the original signal in FIG. 12A into a low-frequency component signal as shown in FIG. 13A and a high-frequency component signal as shown in FIG. 13B, it will be understood that the high-frequency component signal shows a larger change in amplitude than the low-frequency component signal.

Figure 13A:
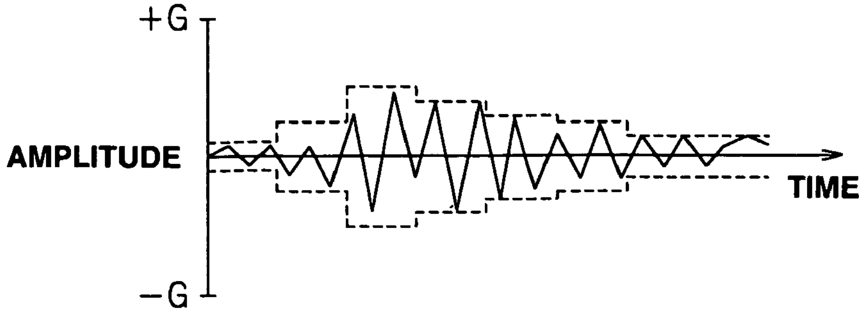
FIGS. 13A through 13D explain an analysis of an original signal by division of the signal into bands.
Figure 13B:
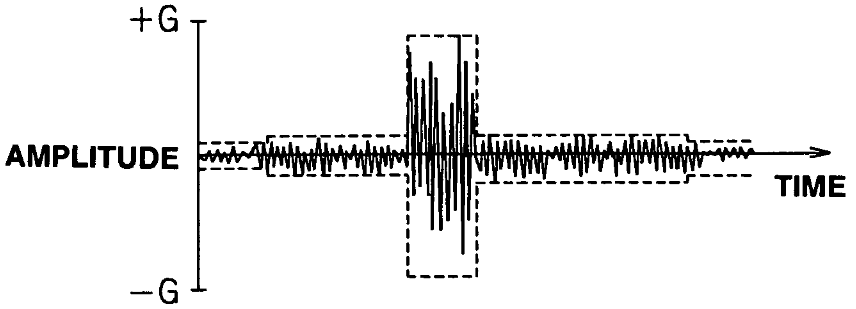
Figure 13C:
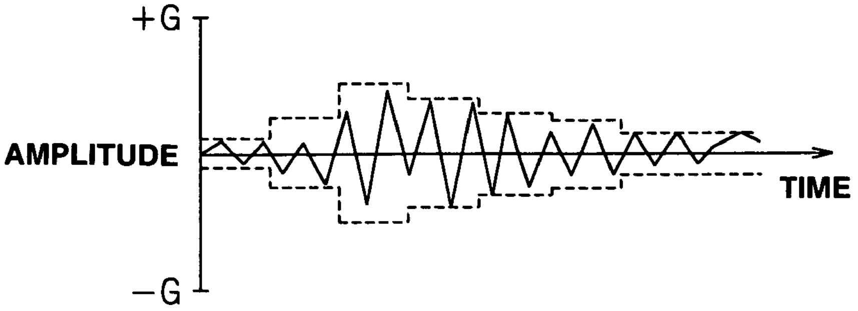
Figure 13D:
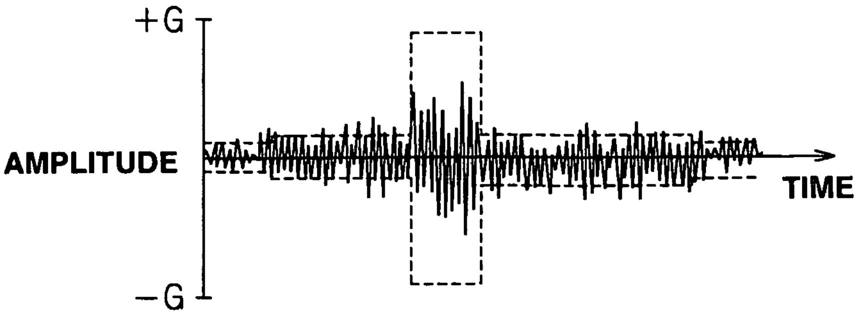

As will be seen from FIG. 13C, the low-frequency component signal showing less amplitude change is restored with the accuracy of the original signal shown in FIG. 13A. Also, as shown in FIG. 13D, the high-frequency component signal showing the large change in amplitude is considerably different from the original signal shown in FIG. 13B. The change of the high-frequency component signal leads to an amplitude change of the restored signal, which will be an acoustic disturbance.

That is, the amplitude change of each signal in a subband is larger than that of its original signal. As will be known from FIGS. 10 and 11, the original signal could not be restored with a high accuracy just by a routine processing of the amplitude of the original signal.

Under the above presupposition, the embodiments of the present invention will be discussed herebelow which can solve the above-mentioned problems:

In the encoder according to the present invention, an acoustic signal is divided into a plurality of frequency bands, the amplitude of each of signals in the plurality of frequency bands is detected in units of sub-blocks of the acoustic signal, and the amplitude of the acoustic signal is processed based on at least one of the detected amplitude information.

Figure 14:
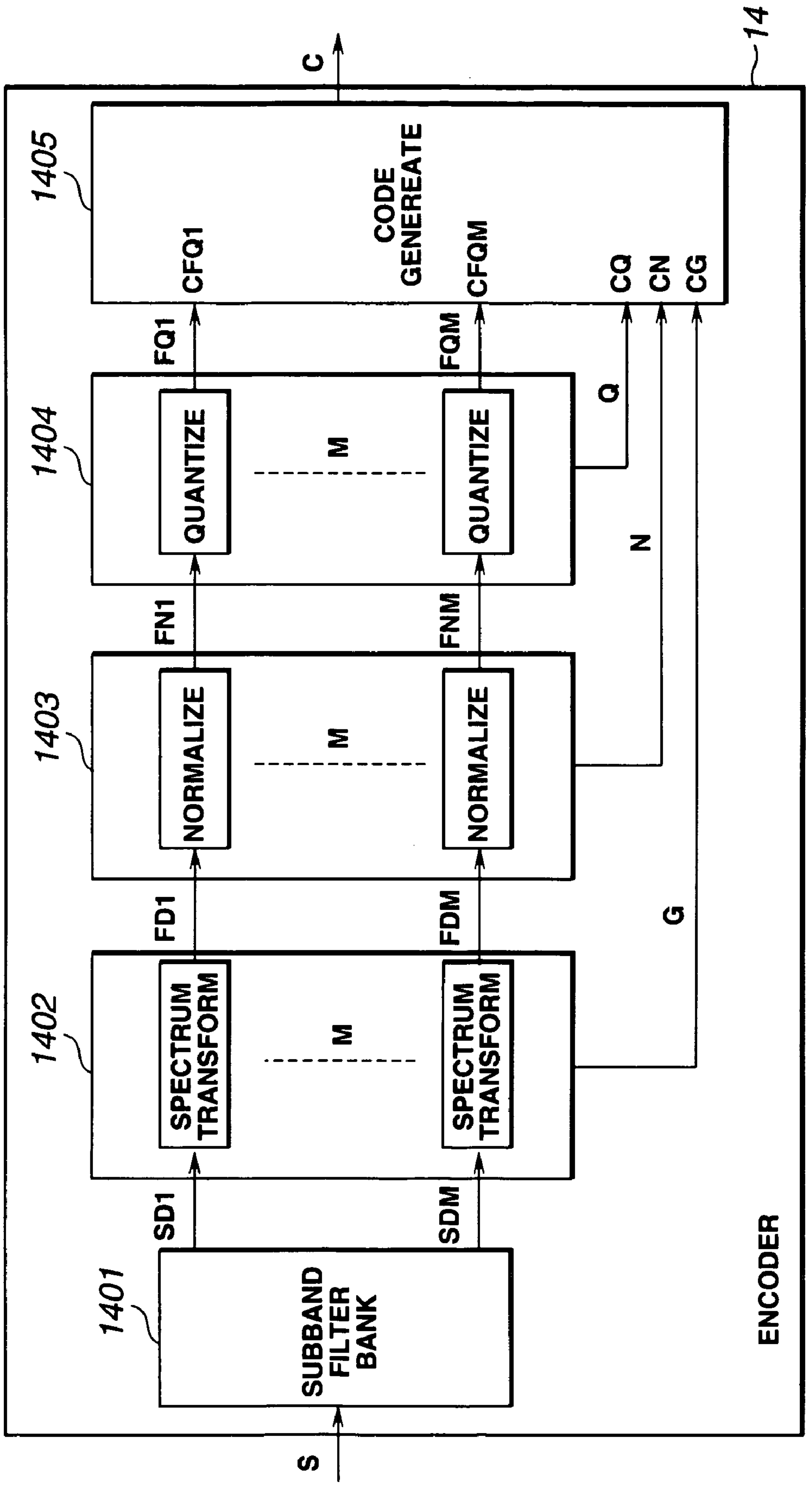
FIG. 14 is a block diagram of a variant of the encoder according to the present invention.

Referring now to FIG. 14, there is schematically illustrated in the form of a block diagram an embodiment of encoder according to the present invention. The encoder is generally indicated with a reference 14.

The encoder 14 comprises a subband filter 1401 to divide an input signal into a plurality (=M) of frequency band signals SD1 to SDM, spectrum transformation circuits 1402 for transformation in spectrum of the frequency band signals SD1 to SDM from the subband filter bank 1401 to provide spectra FD1 to FDM and generate amplitude controlling information G, normalization circuits 1403 for normalization of the spectra FD1 to FDM from the spectrum transformation circuits 1402 to provide normalized spectra FN1 to FNM and generate normalization information N, quantizer 1404 for quantization of the frequency bands of the normalized spectra FN1 to FNM from the normalization circuits 1403 to provide quantized spectra FQ1 to FQM and generate quantization information Q, and a code generator 1405 to generate code rows for the amplitude controlling information G from the spectrum transformation circuits 1402, normalization information N from the normalization circuits 1403 and quantized spectra FQ1 to FQM from the quantizers 1404, respectively.

An original signal S supplied to the encoder 14 is divided by the subband filter bank 1401 into the plurality (M) of frequency bands SD1 to SDM. The subband filter bank 1401 may be a QMF filter bank or PQF filter bank as having previously been described. The frequency band signals SD1 to SDM are transformed in spectrum by the spectrum transformation circuits 1402, respectively. The spectrum transformation circuits 1402 have together an amplitude processor as shown in FIG. 2, 3 or 8. The amplitude processor processes in amplitude the frequency band signals SD1 to SDM by the amplitude controlling information G to provide the spectra FD1 to FDM.

The frequency bands of the original signal divided by the subband filter bank 1401 have their respective amplitudes detected by the spectrum transformation circuits 1402, respectively. The amplitudes are processed based on the amplitude information of at least one of the frequency bands and then subjected to spectrum transformation.

The spectra FD1 to FDM are normalized by the normalization information N in the normalization circuit 1403, respectively, to provide the normalized spectra FN1 to FNM. The normalized spectra FN1 to FNM are quantized by the quantization information Q in the quantization circuits 1404, respectively to provide the quantized spectra FQ1 to FQM. The quantized spectra FQ1 to FQM are transformed along with the amplitude controlling information G, normalization information N and quantization information Q by the code row generator 1405 to provide codes CFQ1 to CFQM, CG, CN and CQ, respectively. These codes are multiplexed to provide a code row C.

Figure 15:
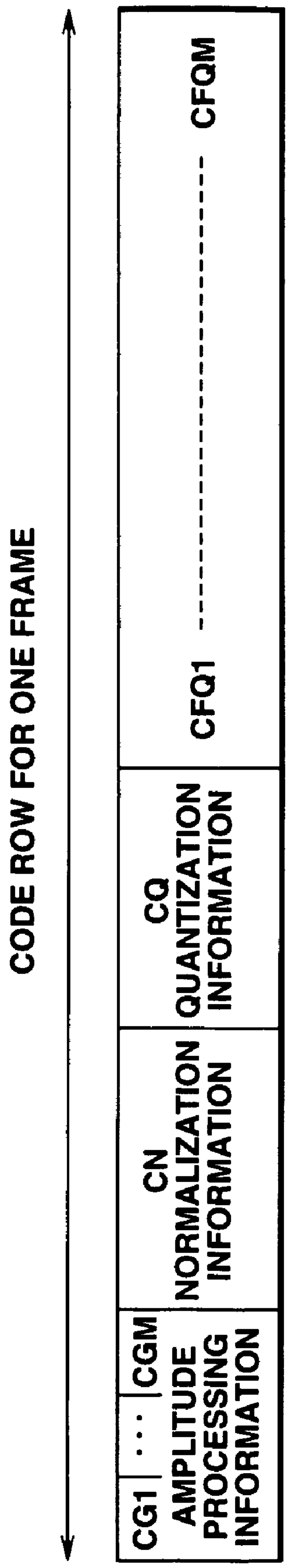
FIG. 15 shows the data configuration of a frame.

FIG. 15 shows the data configuration of a frame being the unit of the code row C provided from the encoder 14. That is, the code row of one frame is composed of amplitude controlling information CG1 to CGM, normalization information CN, quantization information CQ and quantized spectra CFQ1 to CFQM disposed in this order.

The encoder 14 divides an original signal into frequency bands and codes each of the divided signals by processing their amplitudes as shown in FIGS. 10A through 10D and 11A through 11D. Thus, the encoder can suppress the changes in amplitude of the divided signals before coded and after decoded as shown in FIGS. 12A and 12B and 13A through 13D.

Referring now FIGS. 16A through 16D an example will be explained in which an original signal is divided into a number M (=2) of frequency bands in the encoder 14.

Figure 16A:
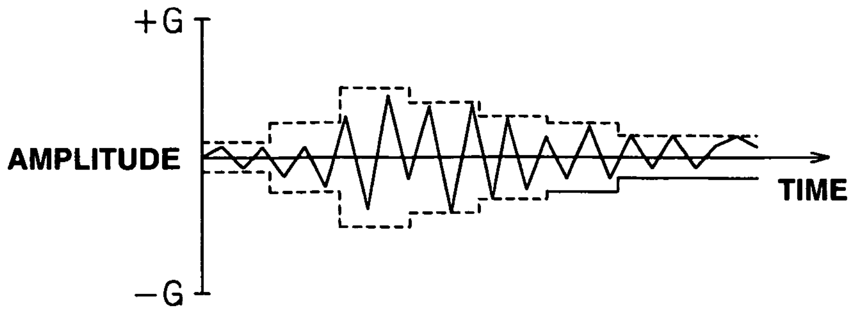
FIGS. 16A through 16D explain how to divide an original signal in bands and utilize only amplitude information of each divided band.
Figure 16B:
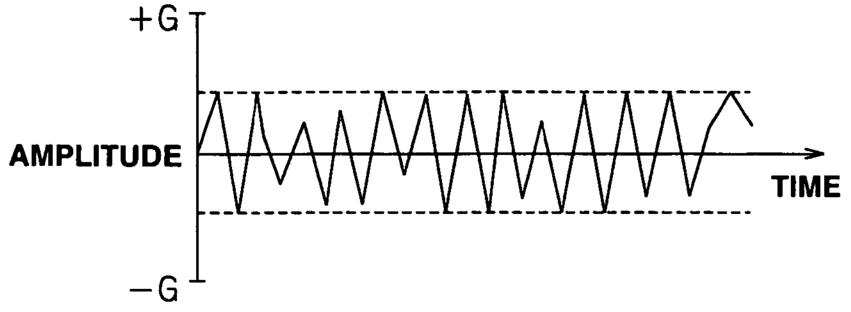
Figure 16C:
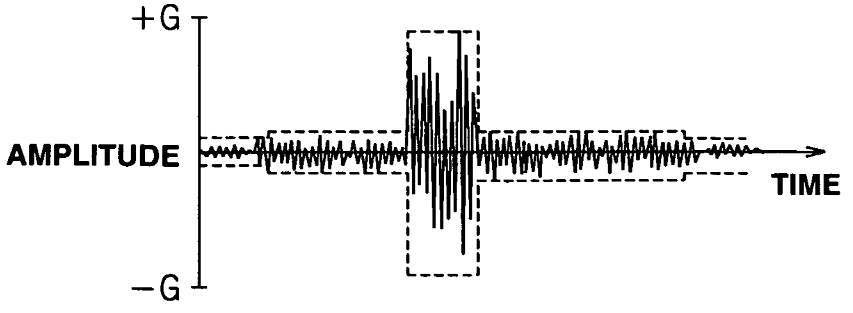
Figure 16D:
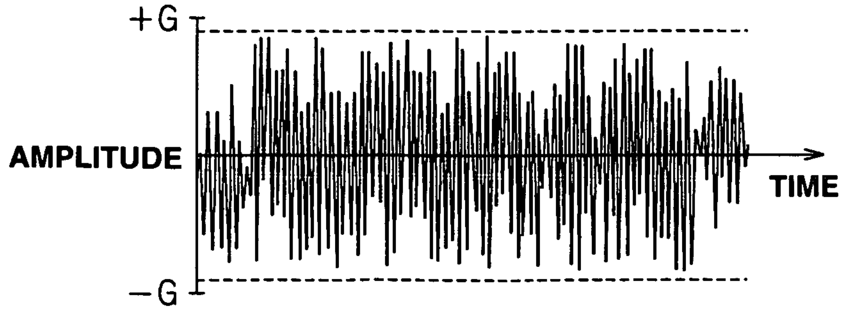

The original signal shown in FIG. 12A is divided by the subband filter bank 1401 into a low-frequency component signal shown in FIG. 16A and a high-frequency component signal shown in FIG. 16C. The divided signals are controlled in amplitude as shown in FIG. 10 to provide an amplitude-processed low-frequency signal shown in FIG. 16B and amplitude-processed high-frequency signal shown in FIG. 16D. These amplitude-processed low- and high-frequency signals are further transformed in spectrum. Thus the waveforms of these signals can be coded with a high efficiency and accuracy, to minimize an acoustic disturbance due to an amplitude change of the restored signal.

Figure 17:
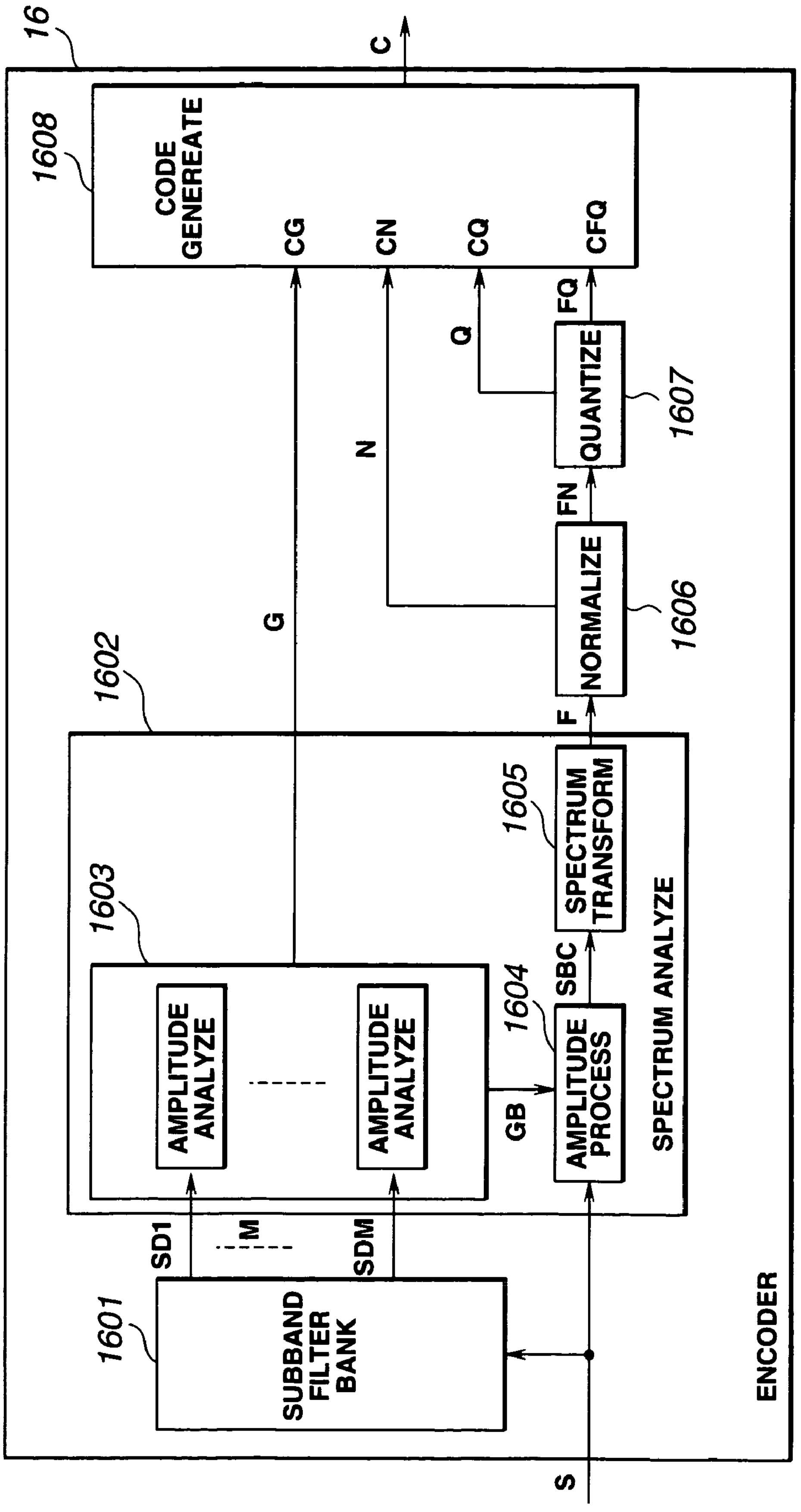
FIG. 17 is a block diagram of another variant of the encoder according to the present invention.

Referring now to FIG. 17, there is schematically illustrated in the form of a block diagram another variant of the encoder of the present invention. The encoder is generally indicated with a reference 16. The encoder 16 utilizes only subband amplitude information to suppress an acoustic disturbance due to an amplitude change of the restored signal in FIG. 13.

The encoder 16 comprises a subband filter band 1601 to divide an input original signal S into a plurality (=M) of frequency band signals SD1 to SDM, a spectrum transformation circuit 1602 for amplitude analysis and spectrum transformation based on the frequency band signals SD1 to SDM and original signal S to generate amplitude controlling information G and spectrum F, a normalization circuit 1606 to normalize the spectrum F to provide a normalized spectrum FN and a normalization information N, a quantizer 1607 for quantization of the normalized spectrum FN to provide a quantized spectrum FQ and generate a quantization information Q, and a code row generator 1608 to generate a code row C based on the amplitude controlling information G, normalization information N, quantization information Q and quantized spectrum FQ.

The spectrum transformation circuit 1602 comprises an amplitude analyzer 1603 for amplitude analysis of the frequency band signals SDI to SDM supplied from the subband filter bank 1601 to generate an amplitude analysis information GB and amplitude controlling information G, an amplitude processor 1604 for amplitude controlling based on the original signal S and amplitude analysis information GB to provide an amplitude-processed signal SBC, and a spectrum transformation circuit 1605 for spectrum transformation of the amplitude-processed signal SBC to provide a spectrum F.

First the input original signal S is divided into two, one of which is divided by the subband filter bank 1601 into a plurality of frequency signals SD1 to SDM. The amplitude information of each of the frequency band signals is analyzed by the amplitude analyzer 1603 to provide an amplitude controlling information GB. The other divided original signal S is passed to the amplitude processor 1604 which processes the original signal S with the amplitude controlling information GB to provide an amplitude-processed signal SBC which will be transformed to an amplitude F by the spectrum transformation circuit 1605.

The spectrum F is normalized with the normalization information N by the normalization circuit 1606 to provide a normalized spectrum FN. The normalized spectrum FN is quantized with the quantization information Q by the quantizer 1607 to provide a quantized spectrum FQ. The quantized spectrum FQ is transformed along with the information G, N and Q by the code row generator 1608 to codes CFQ, CG, CN and CQ, respectively. These codes are multiplexed to provide a code row C.

Figure 18:
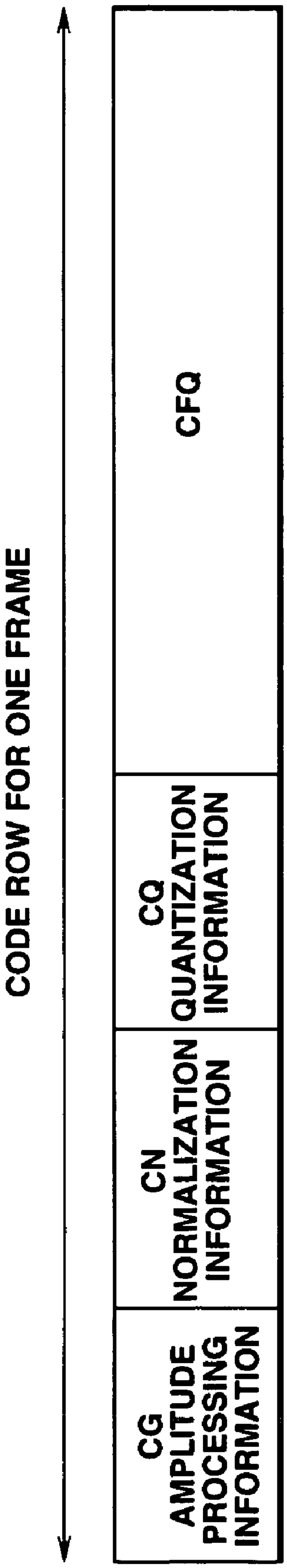
FIG. 18 shows the data configuration of a frame.

The code row C provided from the encoder 16 is configured as one frame being the unit of the code row C as shown in FIG. 18. That is, the code row for one frame is composed of the amplitude controlling information CG, normalization information CN, quantization information CQ and quantized spectrum CFQ in this order.

Referring now to FIGS. 19A through 19D there will be explained an example in which an original signal is divided into a number M (=2) of frequency bands in the encoder 16.

Figure 19A:
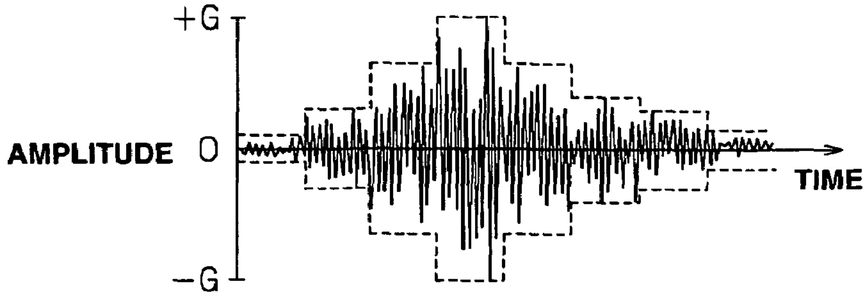
FIGS. 19A through 19D show an example in which a signal band is divided by two in the encoder.
Figure 19B:
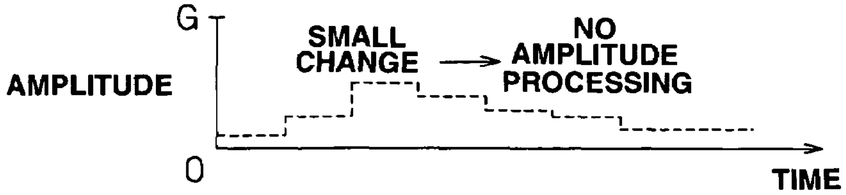
Figure 19C:
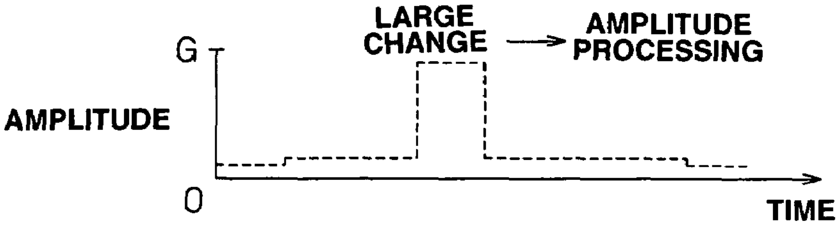
Figure 19D:
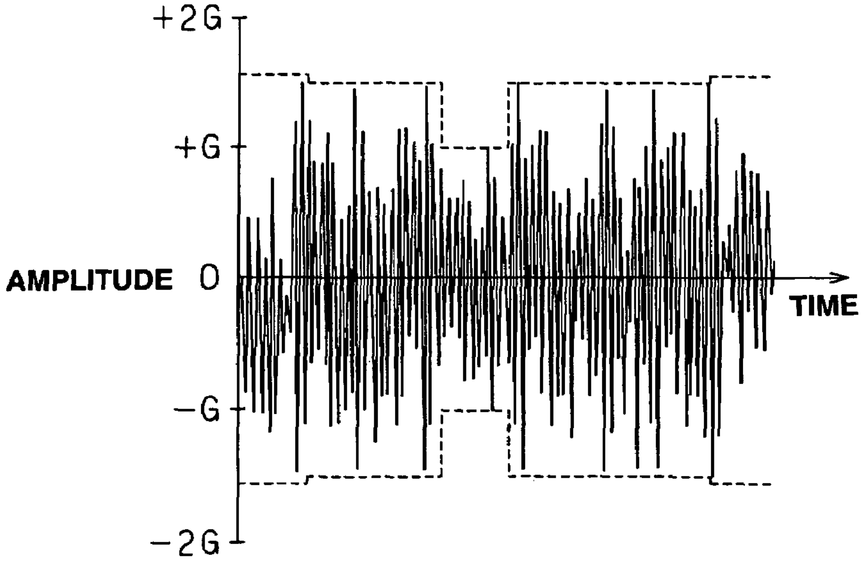

The original signal shown in FIG. 19A is divided by the subband filter bank 1601 into a low-frequency component signal shown in FIG. 16A, an outline of the positive portion of which is shown in FIG. 19B, and a high-frequency component signal shown in FIG. 16C, an outline of the positive portion of which is shown in FIGS. 19C. In the encoder 16, the divided signals are analyzed and only amplitude information of a frequency band whose amplitude change is large is used to process the amplitude of the original signal, so the amplitude processed signal has no constant amplitude as shown in FIG. 19D. Therefore, it cannot be assured that the signal waveform can be coded with a high efficiency and accuracy, but it is possible to suppress the disturbance to the auditory sensation due to an amplitude change of the restored signal of the high-frequency component whose amplitude change is large.

In the foregoing, it has been illustrated and described that division of a blocked signal into sub-blocks for amplitude controlling is effective for a good sound quality. However, coding and recording of all amplitude information of each sub-block will lead to an increased amount of information, which is a contradiction to the intended higher efficiency of coding. To avoid this, the amplitude information is limited to reduce the information for amplitude controlling according to the present invention, as will be described herebelow:

Change points at which gain control is actually done are set, and the gain control is effected for the maximum amplitude to be Gf for each area between one change point and a next one.

FIG. 20A shows an amplitude information of an original signal SB. The magnitude of amplitude is detected in an order from a top sub-block. Amplitude change amounts and order of change amounts are also shown. In this example, the sub-blocks with least amplitude change amounts are selected for least possible disturbance to the auditory sensation, to reduce the amount of amplitude controlling information.

FIG. 20B shows three sub-blocks with largest amplitude change amounts, selected for amplitude controlling. Change points at which gain is actually controlled are set as shown, and the gain control is effected for the maximum amplitude to be Gf for each area between one change point and a next one.

FIG. 20C shows an amplitude controlling information GB obtained by the processing shown in FIG. 20B. FIG. 20D shows an amplitude-processed signal SBG resulted from processing of the original signal SB with the amplitude controlling information GB.

The amplitude shown in FIG. 20D is not constant within a block. The sub-blocks whose amplitude changes are large are controlled in amplitude to cut off the information amount of the sub-blocks whose amplitude changes are small. By positively controlling the amplitude for portions of a signal waveform at which the amplitude is likely to change greatly due to coding and/or decoding, it is possible to suppress an acoustic disturbance, appearing in a decoded signal.

FIGS. 21A through 21D are also an illustration similar to that in FIGS. 20A through 20D, showing how to reduce the information amount for amplitude controlling.

Figures 21A, 21B, 21C, 21D:
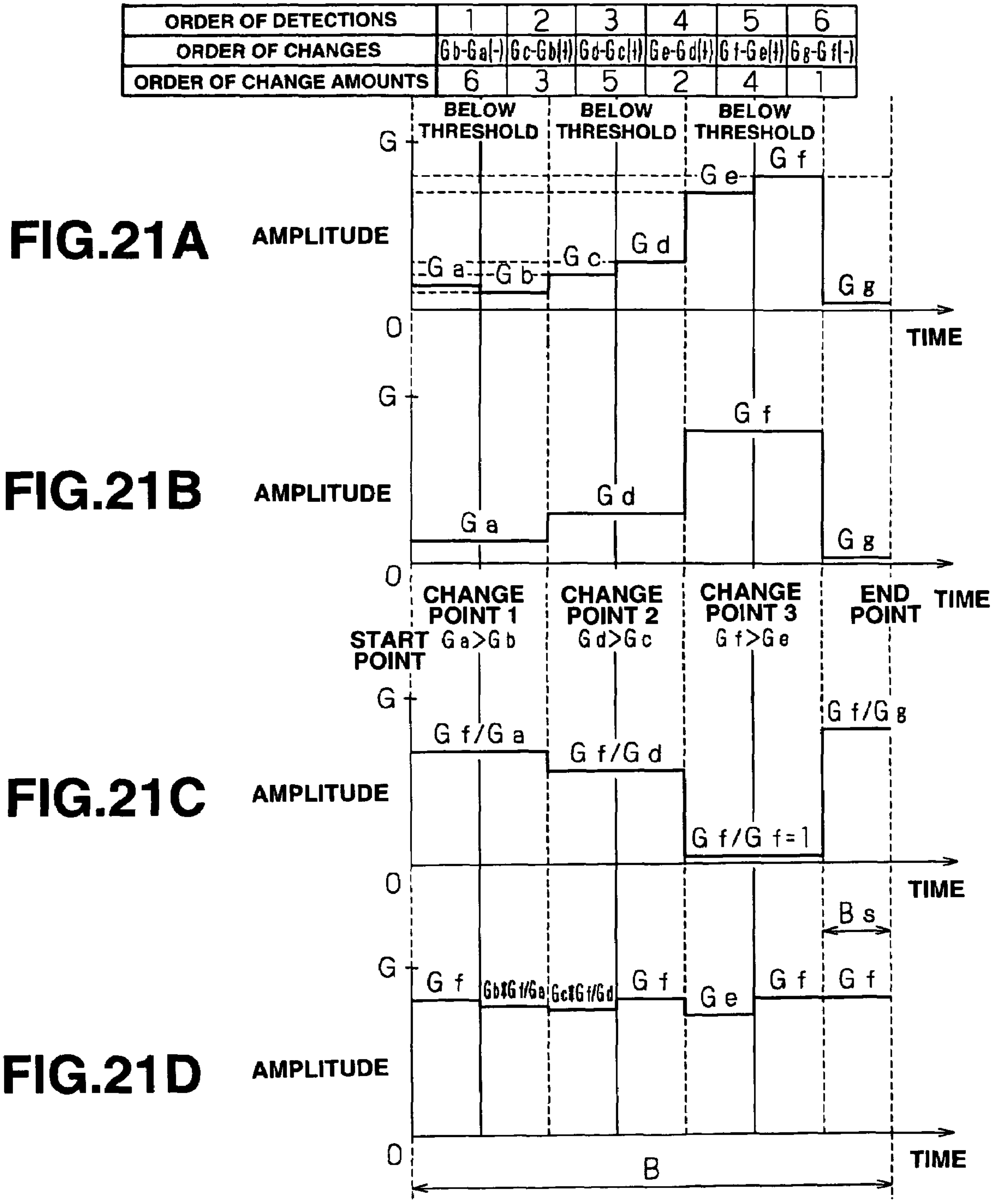
FIGS. 21A through 21D show how to reduce amount of information on the amplitude controlling.

FIG. 21A shows an amplitude information of an original signal SB. The magnitude of amplitude is detected in an order from a top sub-block. Amplitude change amounts and order of change amounts are also shown. In this example, the sub-blocks with smaller amplitude change amounts than a predetermined threshold are selected for least possible disturbance to the auditory sensation, to reduce the amount of amplitude controlling information.

FIG. 21B shows a reduction of amplitude information amount by combining a sub-block, of which the amplitude is to be processed and the difference in amplitude from its neighboring sub-blocks is smaller than a predetermined threshold, with the neighboring sub-blocks. In this example, if the amount of amplitude change detected at each change point is smaller than the predetermined threshold, the amplitude is processed so that the maximum amplitude of one of sub-blocks neighboring the change point, whose amplitude is larger, becomes Gf.

FIG. 21C shows an amplitude controlling information GB derived from the processing in FIG. 21B, and FIG. 21D shows an amplitude-processed signal SBG resulted from processing of the original signal SB with the amplitude controlling information GB.

The amplitude shown in FIG. 21D is not constant within a block. The sub-blocks whose amplitude changes are large are controlled in amplitude to cut off the information amount of the sub-blocks whose amplitude changes are small. By positively controlling the amplitude for portions of a signal waveform at which the amplitude is likely to change greatly due to coding and/or decoding, it is possible to suppress an acoustic disturbance, appearing in a decoded signal.

Figure 22:
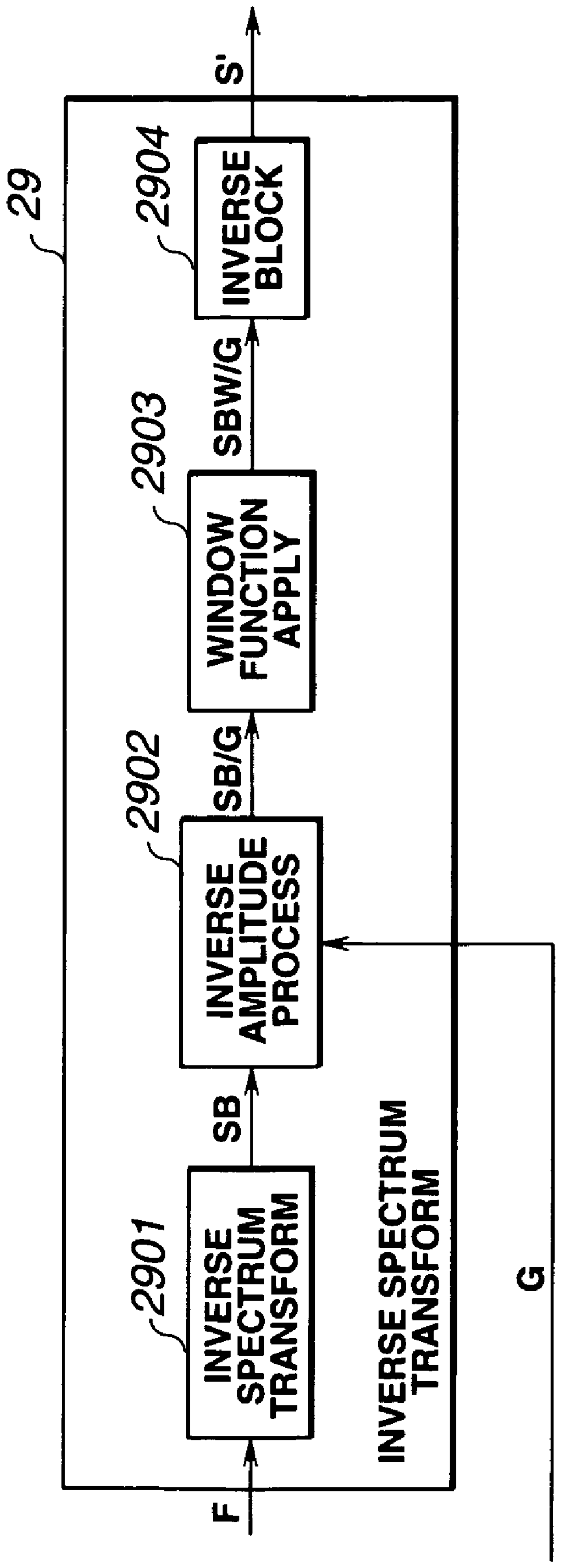
FIG. 22 is a block diagram of an inverse spectrum transformation circuit.

Referring now to FIG. 22, there is schematically illustrated in the form of a block diagram an inverse spectrum transformation circuit to combine the inversely normalized spectra for synthesis of a time domain signal. The inverse spectrum transformation circuit is generally indicated with a reference 29.

As shown in FIG. 22, the inverse spectrum transformation circuit 29 comprises an inverse spectrum transformation circuit 2901 for inversely transforming an input spectrum F to provide a restored block signal SB, an inverse amplitude controlling circuit 2902 for inversely processing the restored block signal SB and an amplitude controlling information G supplied from outside to provide SB/G, a window function application circuit 2903 for applying the window function W to the SB/G to provide SBW/G, and an inverse blocking circuit 2904 for inversely blocking the SBW/G to provide a time domain signal S'.

In the inverse spectrum transformation circuit 29, first the restored spectrum F is inversely transformed by the inverse spectrum transformation circuit 2901 to provide a restored blocked signal SB to the inverse amplitude controlling circuit 2902. In the inverse amplitude controlling circuit 2902, the restored blocked signal SB is processed by reversely effecting the amplitude controlling having been done with the amplitude controlling information G in the encoder. The restored blocked signal SB whose amplitude has thus inversely been processed is applied with the window function W by the window function application circuit 2903 to keep the matching with those preceding and following the blocked signal SB in consideration, and combined with the preceding and following blocked signals by the inverse blocking circuit 2904 to provide a restored time domain signal S'.

Figure 23:
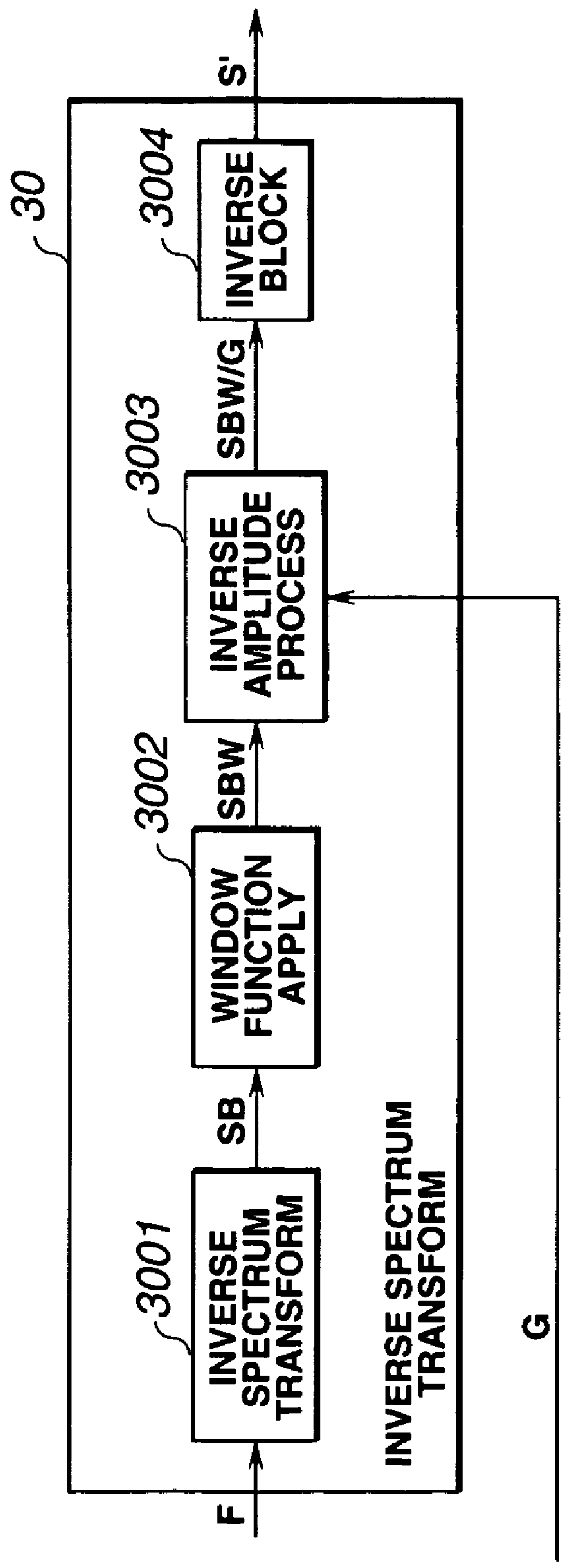
FIG. 23 is a block diagram of a variant of the inverse spectrum transformation circuit.

FIG. 23 illustrates, in the form of a block diagram, a variant of the inverse spectrum transformation circuit in FIG. 22. The inverse spectrum transformation circuit is generally indicated with a reference 30.

The inverse spectrum transformation circuit 30 comprises an inverse spectrum transformation circuit 3001 for inverse transformation of an input spectrum F to provide a restored blocked signal SB, a window function application circuit 3002 for applying the window function W to the restored blocked signal SB to provide SBW, an inverse amplitude processor 3003 for inverse processing of the SBW and an amplitude controlling information G supplied from outside to provide SBW/G, and an inverse blocking circuit 3004 for inversely blocking the SBW/G to provide a time domain signal S'.

In the inverse spectrum transformation circuit 30, first the restored spectrum F is inversely transformed by the inverse spectrum transformation circuit 3001 to provide a restored blocked signal SB. The window function application circuit 3002 applies the window function W to the restored blocked signal SB to keep the matching of the blocked signal SB with those preceding and following the blocked signal SB, and further the restored blocked signal SB is processed in the inverse amplitude controlling circuit 3003 by reversely effecting the amplitude controlling having been done with the amplitude controlling information G in the encoder. The restored blocked signal SB whose amplitude has thus inversely been processed is combined with the blocked signals preceding and following the blocked signal SB in the inverse blocking circuit 3004 to provide a restored signal S'.

Referring now to FIG. 24A through 24G, operations effected in the inverse blocking circuit 29 shown in FIG. 22 will be described below.

Figures 24A, 24B, 24C, 24D, 24E, 24F, 24G:
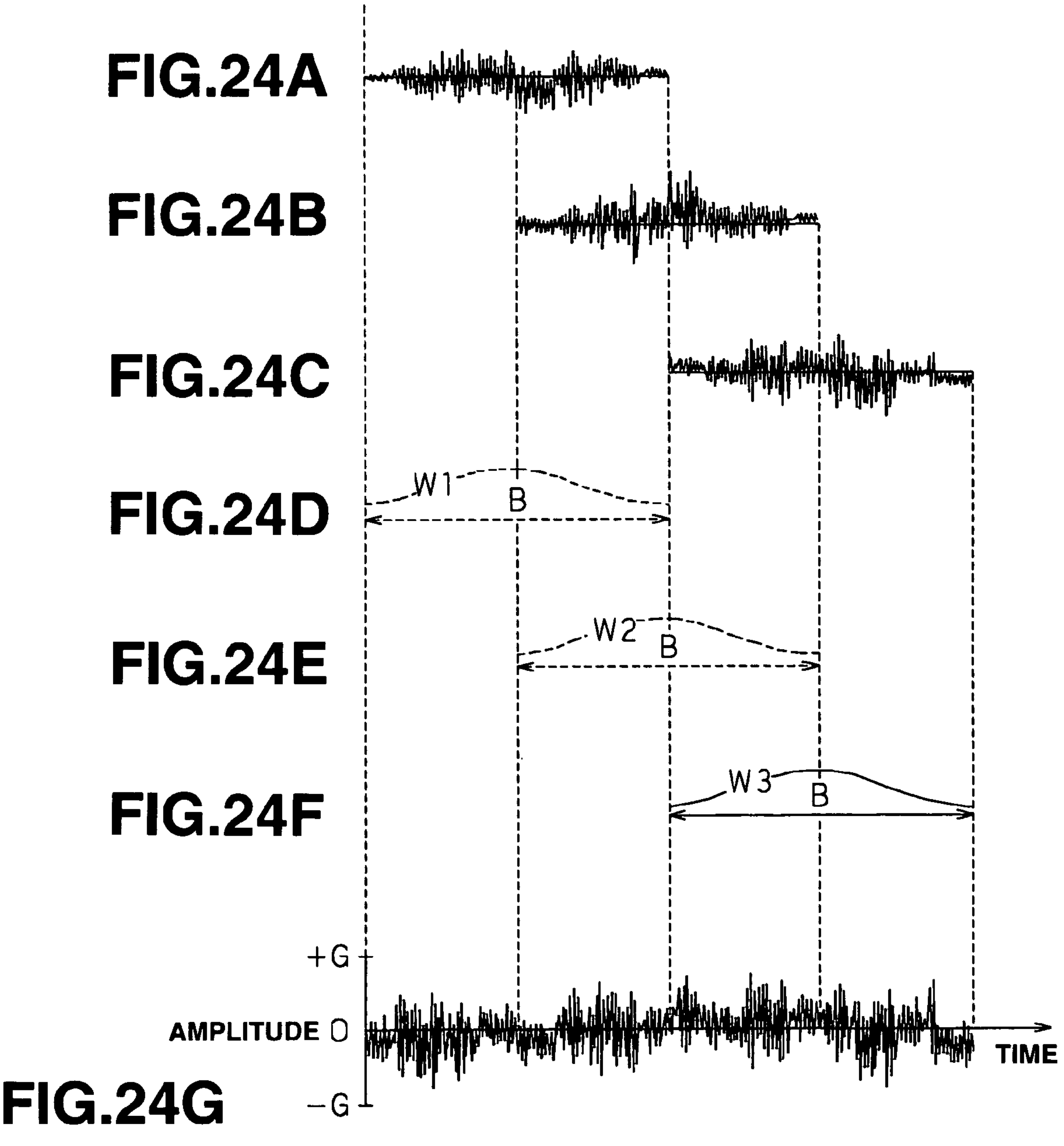
FIGS. 24A through 24G explain operations effected in an inverse blocking circuit.

As shown in FIGS. 24A through 24G, a restored blocked signal SB/G1 in FIG. 24A transformed in spectrum for each block, restored blocked signal SB/G2 in FIG. 24B and restored blocked signal SB/G3 in FIG. 24C share their own halves in common with the blocked signals preceding and following them, respectively. For a composite amplitude of the common portions of these blocked signals SB/G1, SB/G2 and SB/G3, a window function W1 in FIG. 24D, window function W2 in FIG. 24E and window function W3 in FIG. 24F are applied to the blocked signals SB/G1, SB/G2 and SB/G3 to provide a restored signal S' shown in FIG. 24G.

Figure 25:
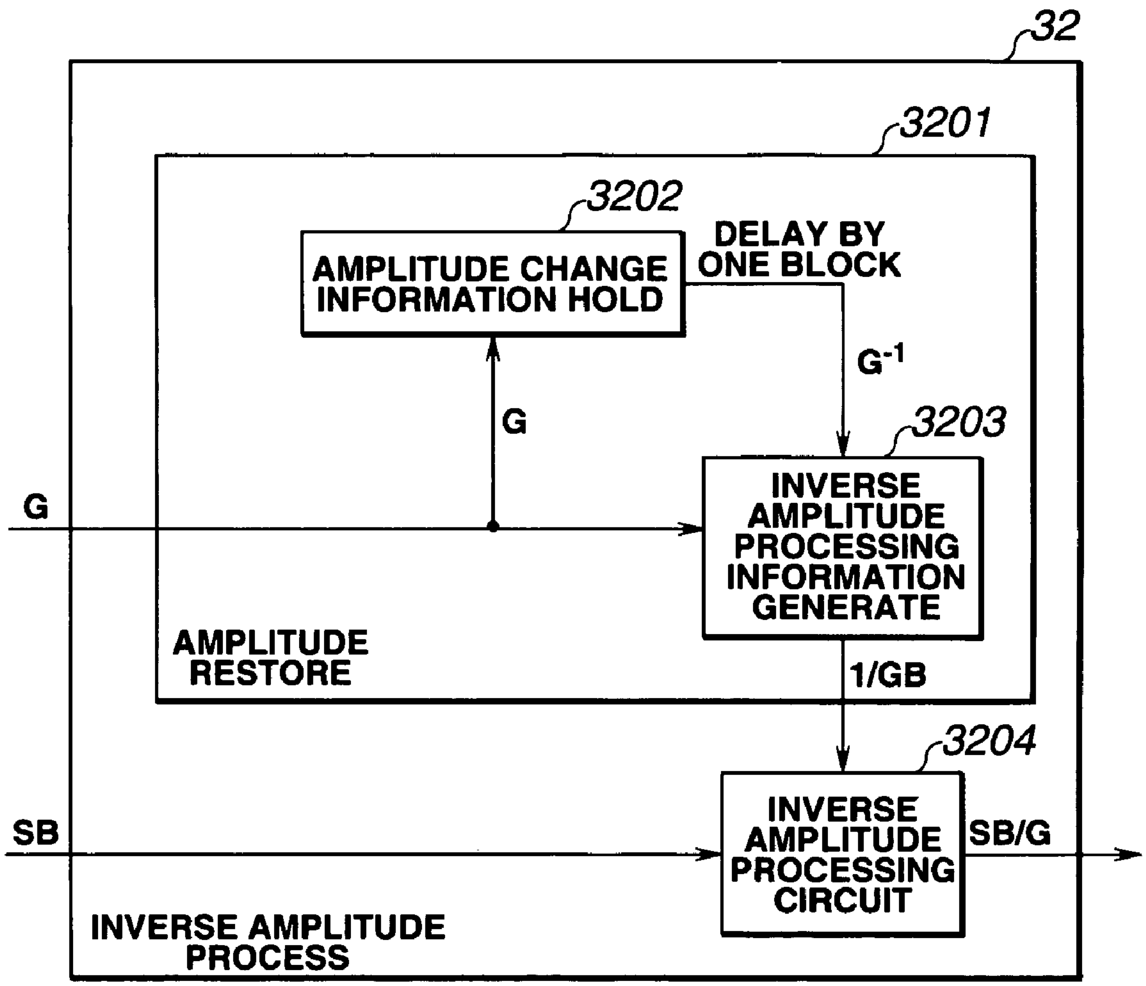
FIG. 25 is a block diagram of an inverse amplitude controlling circuit.

The inverse amplitude controlling circuit 2902 of the inverse spectrum transformation circuit 29 shown in FIG. 22 may be implemented like an inverse amplitude processor 32 shown in FIG. 25.

The inverse amplitude processor 32 comprises an amplitude restoration circuit 3201 to restore an amplitude from an input amplitude controlling information G, and an inverse amplitude controlling circuit 3204 to generate a restored blocked signal SB/G based on the supplied amplitude-processed signal SB and an inverse amplitude controlling information 1/GB supplied from the amplitude restoring circuit 3201.

The amplitude restoring circuit 3201 comprises an amplitude controlling information holder 3202 for holding the amplitude controlling information G to delay it by one block, and an inverse amplitude controlling information generator 3203 to generate an inverse amplitude controlling information based on the delayed amplitude controlling information and amplitude controlling information G supplied from the amplitude controlling information holder 3202.

In the inverse amplitude processor 32, first the amplitude restoration circuit 3201 uses the amplitude controlling information G for reversely effecting the amplitude controlling procedure effected in the encoder to generate an inverse amplitude controlling information 1/GB, and the inverse amplitude controlling circuit 3204 transforms the amplitude of the restored blocked signal SB to provide a restored blocked signal SB/G.

In the amplitude restoration circuit 3201, the inverse amplitude controlling information generator 3203 generates an inverse amplitude controlling information 1/GB from an amplitude information G-1 and amplitude control information G supplied from the amplitude controlling information holder 3202.

Figure 26:
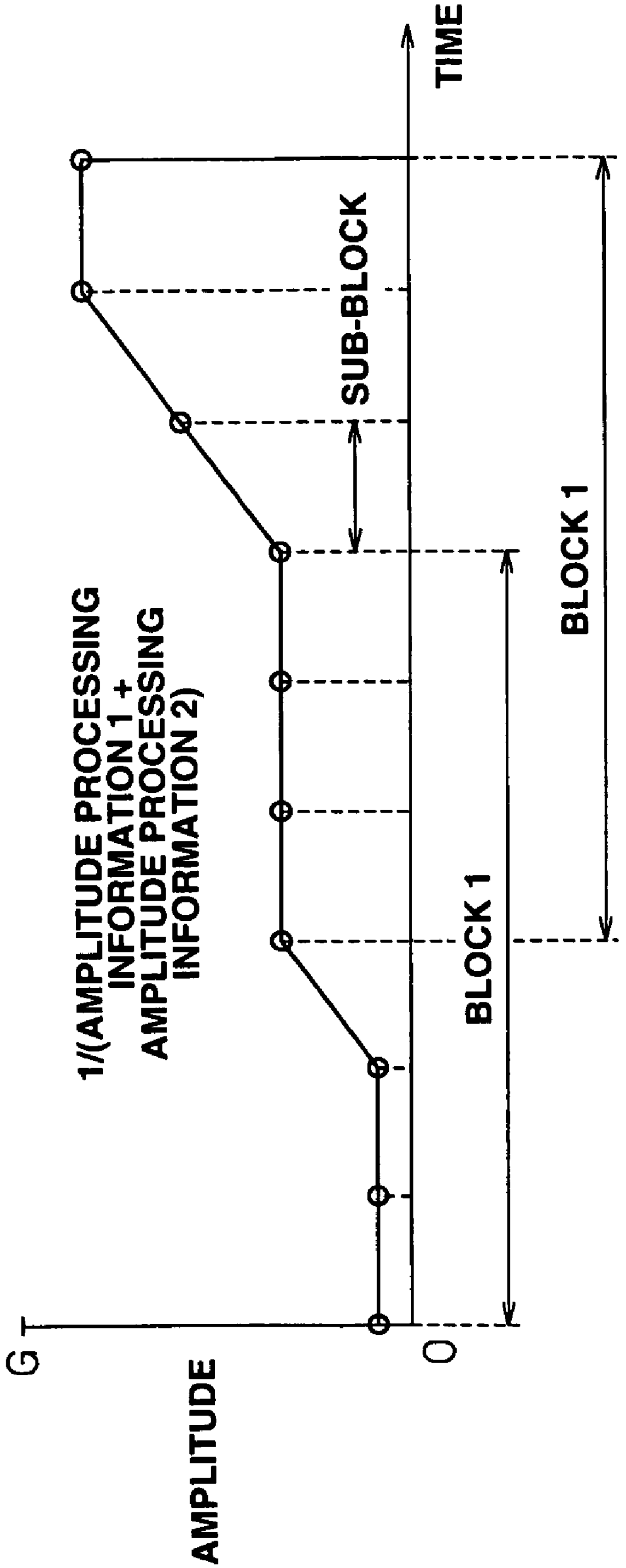
FIG. 26 explains an amplitude controlling by restoration of the amplitude of each sub-block.

As shown in FIG. 26, the inverse amplitude controlling information generator 3204 generates an inverse amplitude controlling information 1/GB by which the amplitude of each sub-block is restored for amplitude controlling. If an amplitude difference between sub-blocks has been curve-interpolated in the encoder, it is necessary to effect a curve interpolation also in the decoder to accurately restore the amplitude of the inversely amplitude-processed signal.

Figure 27:
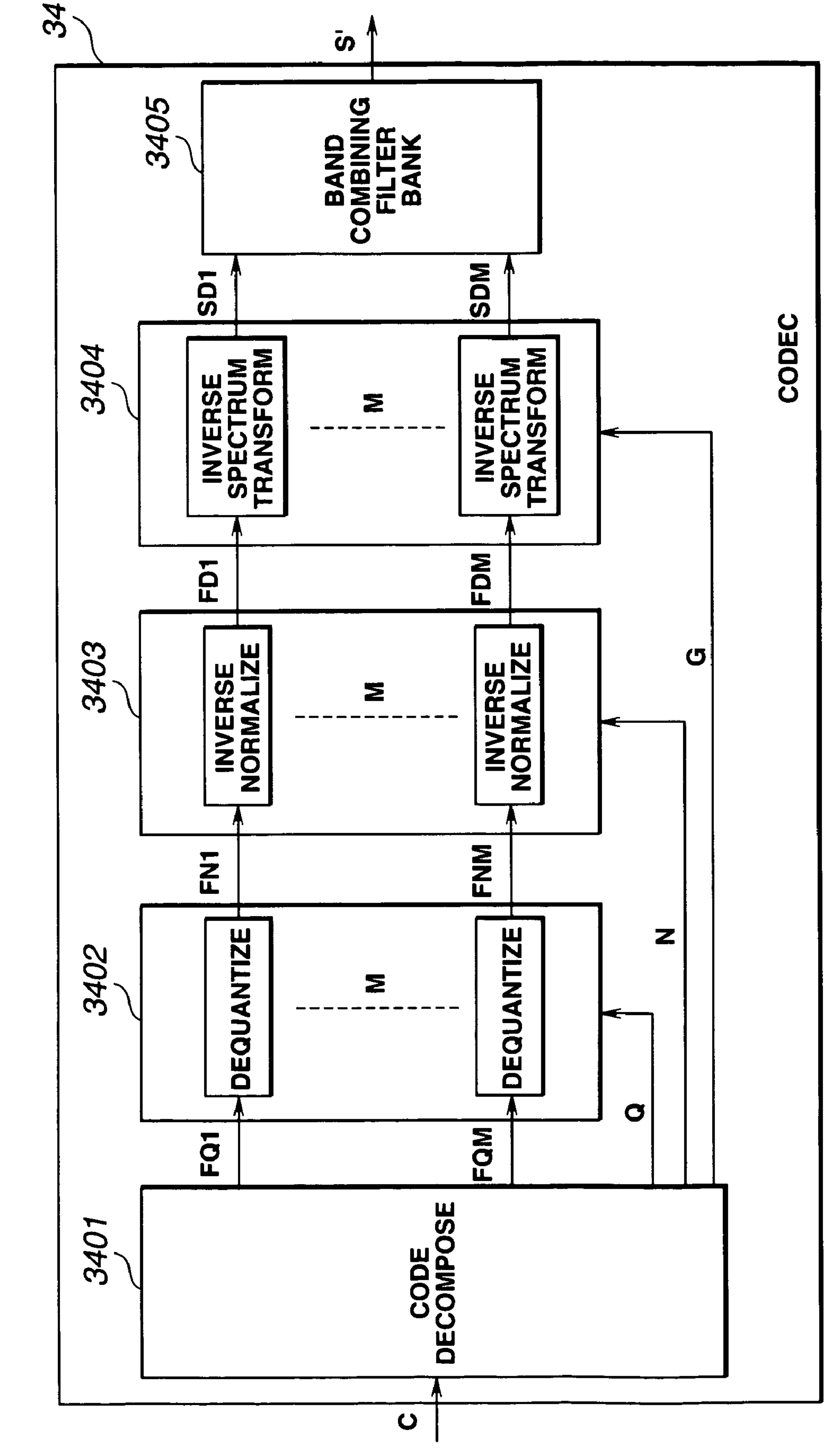
FIG. 27 is a block diagram of an encoder-decoder (will be referred to as "CODEC" hereinafter)

Referring now to FIG. 27, there is illustrated, in the form of a block diagram, a CODEC adapted, according to the present invention, to decode a code row produced by dividing an acoustic signal into frequency bands using a subband filter and controlling the amplitude of each band in the encoder. The decoder is generally indicated with a reference 34.

The CODEC 34 comprises a code decomposition circuit 3401 to decompose an input code row C into a plurality (=M) of quantized spectra FQ1 to FQM, a dequantizer 3402 for dequantization of the quantized spectra FQ1 to FQM from the code decomposition circuit 3401 to provide normalized spectra FN1 to FNM, an inverse normalization circuit 3403 for inverse normalization of the normalized spectra FN1 to FNM from the dequantizer 3402 for provide spectra FD1 to FDM, an inverse spectrum transformation circuit 3404 for inverse spectrum transformation of the spectra FN1 to FNM to provide restored signals SD1 to SDM, and a band combining filter bank 3405 for combination in band of the restored signals SD1 to SDM to provide a time domain signal SD'.

In this CODEC 34, the code row C is decomposed by the code row decomposition circuit 3401 into the quantized spectra FQ1 to FQM for each frequency band, and the quantization information Q, normalization information N and amplitude controlling information G are extracted from the code row C.

The quantized spectra FQ1 to FQM obtained by the decomposition in the code row decomposition circuit 3401 are dequantized by the dequantizer 3402 using the quantization information Q to provided normalized spectra FN1 to FNM, inversely normalized by the inverse normalization circuit 3403 using the normalization information N, and combined by the inverse spectrum transformation circuit 3404 to provide the restored signals SD1 to SDM for the frequency bands. These restored signals SD1 to SDM are restored by the subband filter bank 3405 to the restored signal S' including all the frequency band signals.

The inverse spectrum transformation circuit 3404 is configured like the inverse spectrum transformation circuit 29 in FIG. 22 and inverse spectrum transformation circuit 30 shown in FIG. 23. It provides an inverse spectrum transformation based on the amplitude controlling information G.

in FIGS. 28A through 28D shows comparison between the result of a signal coding and/or decoding without amplitude controlling and that of a signal coding and/or decoding with amplitude controlling.

Figure 28A:
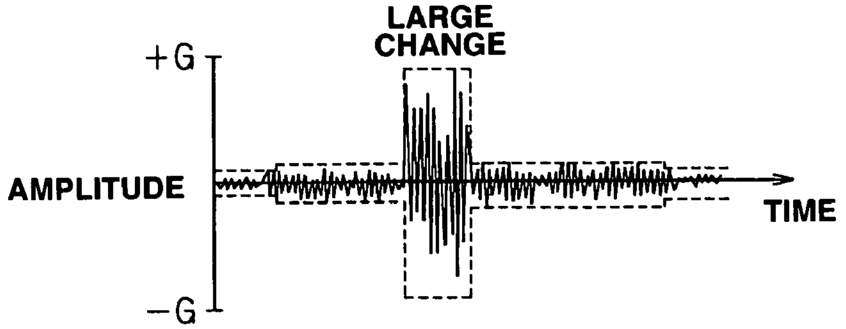
FIGS. 28A through 28D show comparison between the result of a signal coding and/or decoding without amplitude controlling and that of a signal coding and/or decoding with amplitude controlling for each band.
Figure 28B:
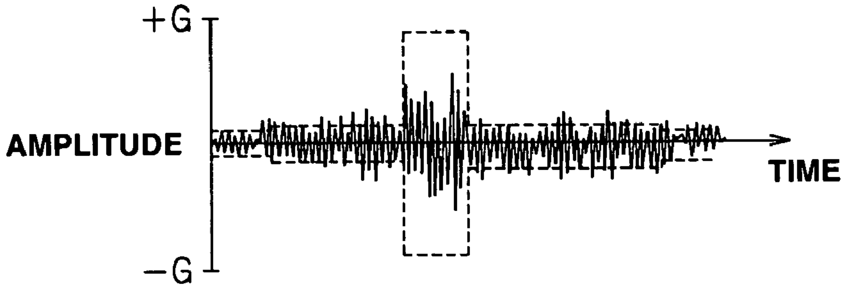

FIG. 28A shows a waveform of the high-frequency component signal of the original signal waveform in FIG. 12A. If the signal is coded or decoded without being controlled in amplitude, the restored signal will have a waveform as shown in FIG. 28B. Since the restored signal is greatly changed in amplitude in comparison with the original signal, a disturbance will arise to the auditory sensation.

Figure 28C:
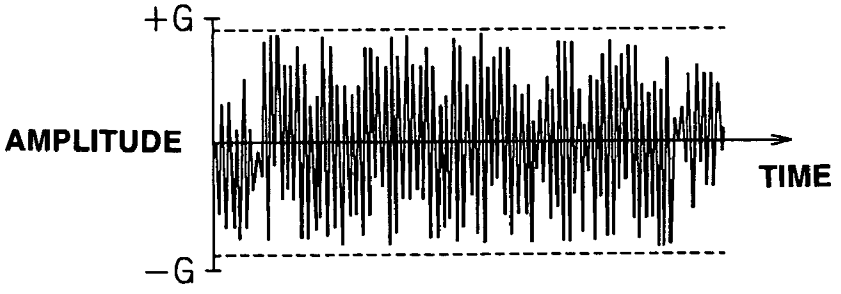
Figure 28D:
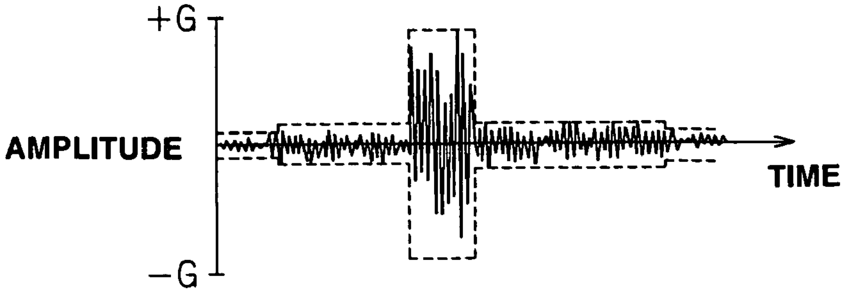

FIG. 28C shows a signal resulted from amplitude transformation effected in the encoder, as shown in FIGS. 10A through 10D, of the waveform in FIG. 28A for the amplitude in the blocked signal to be constant. By coding the waveform in FIG. 28C and inversely transforming its amplitude for decoding, it is possible to provide a restored signal having a waveform shown in FIG. 28D and which has an amplitude faithful to the waveform shown in FIG. 28A.

Figure 29:
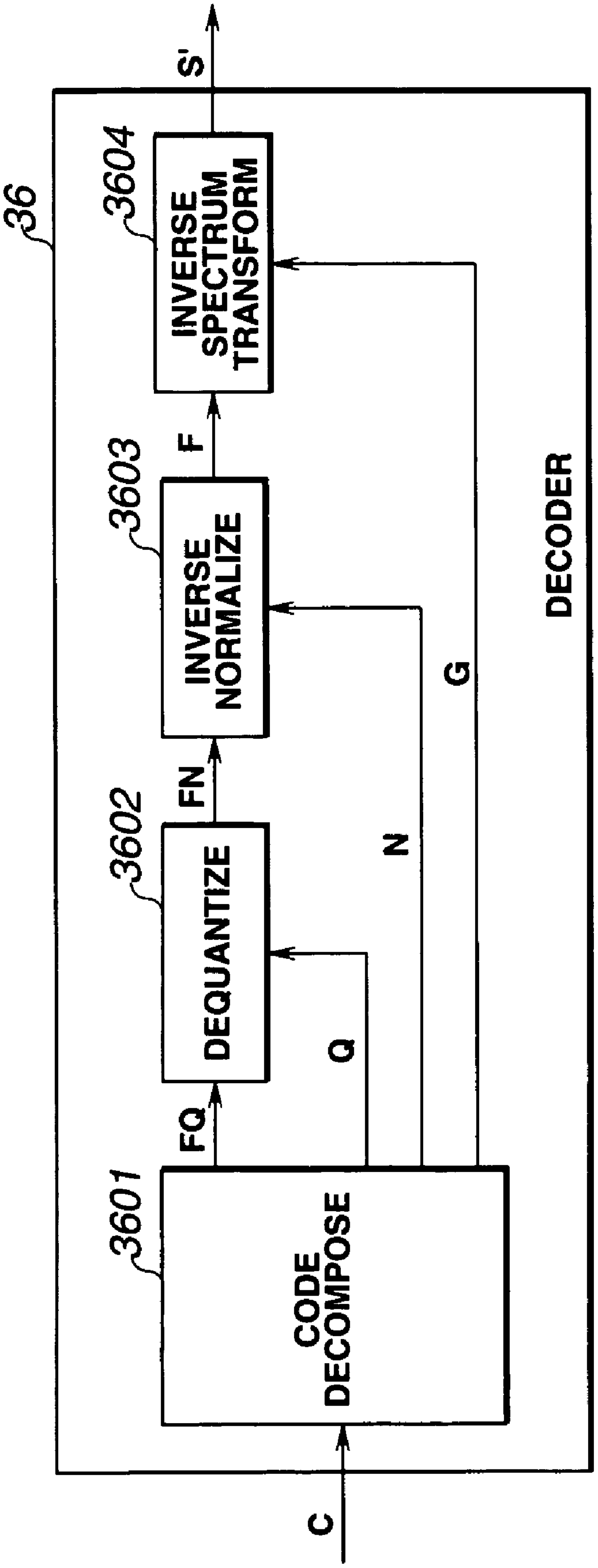
FIG. 29 is a block diagram of a decoder according to the present invention.

Referring now to FIG. 29, there is illustrated in the form of a block diagram a decoder according to the present invention. The decoder is generally indicated with a reference 36. The decoder 36 is adapted to decode a code row produced by dividing an original signal into frequency band signals by the subband filter in the encoder and coding the frequency band signals utilizing only the amplitude information of each bands.

The decoder 36 comprises a code row decomposition circuit 3601 to decompose an input code row C into the quantized spectrum FQ, quantization information Q, normalization information N and amplitude controlling information G, a dequantizer 3602 to generate normalized spectrum FN based on the quantized spectrum FQ and quantization information Q from the code row decomposition circuit 3601, an inverse normalization circuit 3602 to restore the spectrum F based on the normalized spectrum FN from the dequantizer 3602 and normalization information N from the code row decomposition circuit 3601, and an inverse spectrum transformation circuit 3606 for inverse spectrum transformation based on the spectrum F from the inverse normalization circuit 3603 and amplitude controlling information G from the code row decomposition circuit 3601 to restore the time domain signal G', For obtaining an amplitude information of each band in the encoder, a subband filter is necessary. However, since the decoder 36 has only to inversely process the amplitude of a signal not divided into frequency bands, so the band combining filter 3405 as in the CODEC 34 shown in FIG. 27 is not required. Therefore, the decoder 36 has the same configuration as that of the basic decoder 24 as will be shown in FIG. 34, namely, it has a simplified configuration.

Figure 30A:
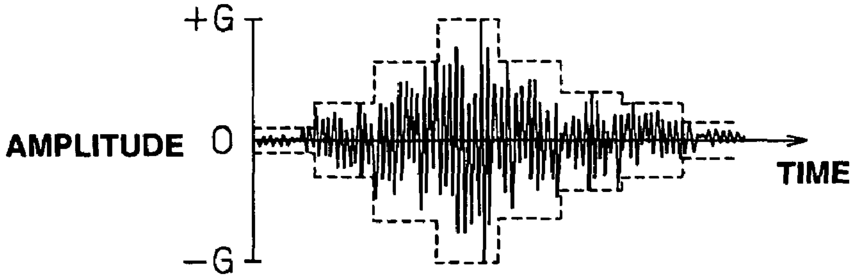
FIGS. 30A through 30D show comparison between the result of a signal coding and/or decoding without amplitude controlling and that of a signal coding and/or decoding with amplitude controlling for each band.
Figure 30B:
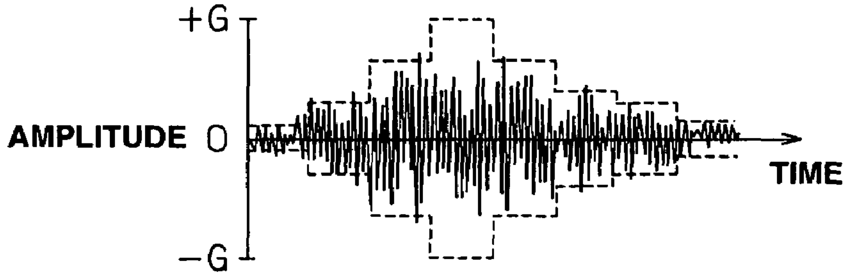

FIGS. 30A through 30D show comparison between the result of a signal coding and/or decoding without amplitude controlling and that of a signal coding and/or decoding with amplitude controlling. FIG. 30A shows a waveform of the high-frequency component signal shown in FIG. 12. When the waveform is coded and/or decoded without amplitude controlling, a waveform shown in FIG. 30B will result. As seen, the restored signal has the amplitude thereof greatly changed as compared with the original signal and will be an acoustic disturbance.

Figure 30C:
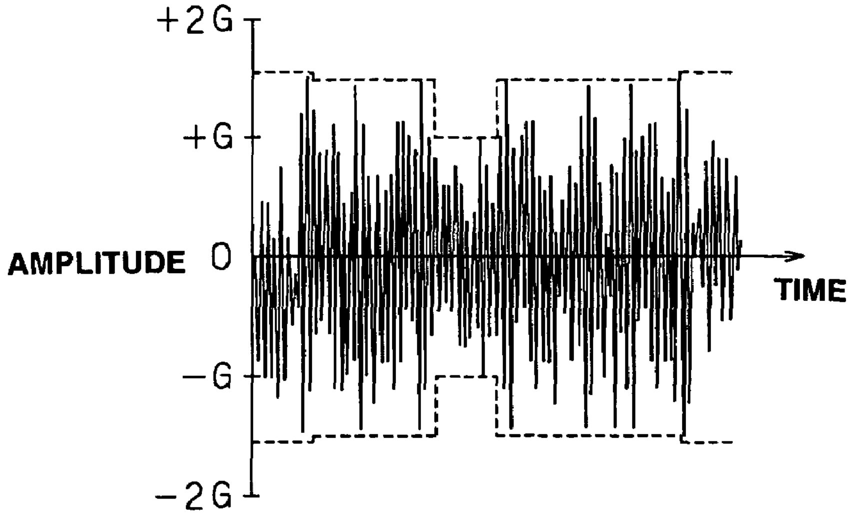
Figure 30D:
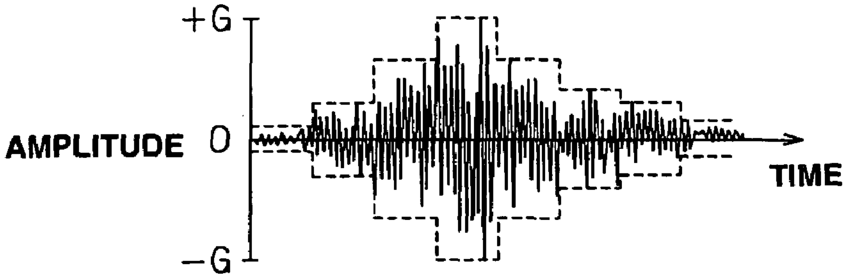

FIG. 30C shows a signal resulted from amplitude transformation effected in the encoder, as shown in FIG. 17, of the waveform in FIG. 30A for the amplitude of the high-frequency component signal to be constant. By coding the waveform in FIG. 30C and inversely transforming its amplitude for decoding, it is possible to provide a restored signal having a waveform shown in FIG. 30D and which has an amplitude faithful to the waveform shown in FIG. 30A.

Next, there will be described herebelow a decoder adapted, according to the present invention, to decode a coded data obtained by coding a data after having been controlled in amplitude.

Figure 31:
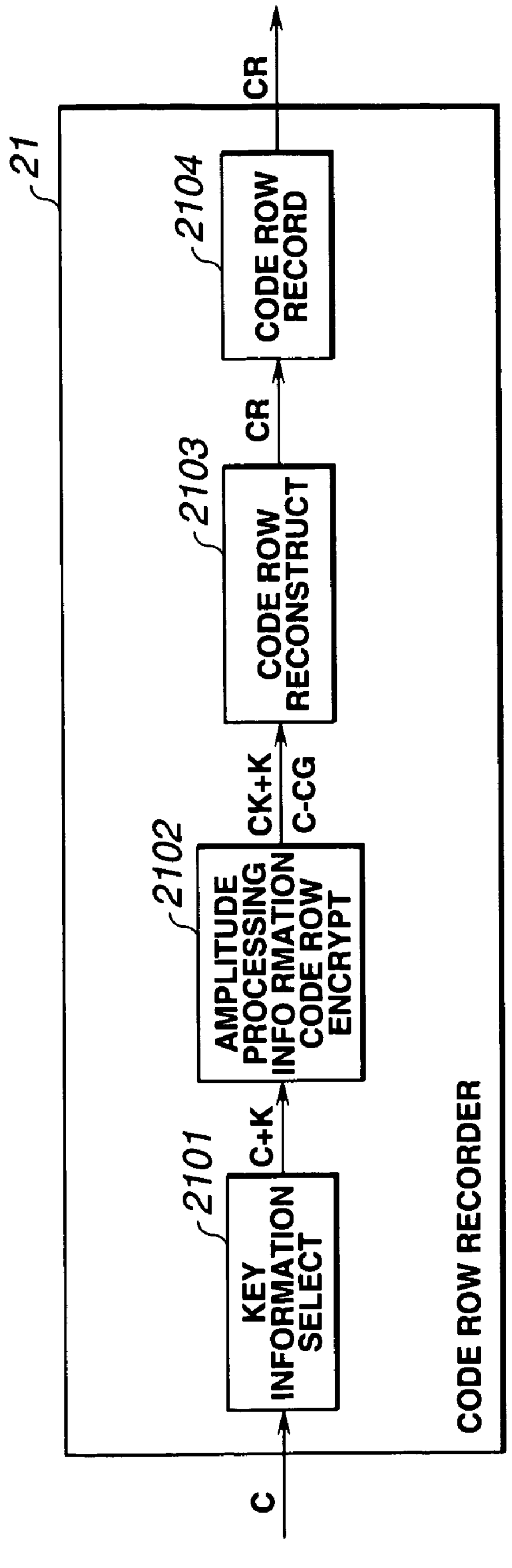
FIG. 31 is a code row recorder.

Referring now to FIG. 31, there is illustrated a code row recorder to record into a recording medium a code row C generated by the encoder or transmit it to the recording medium by communications. The core row recorder is generally indicated with a reference 21.

The core row recorder 21 comprises, as shown in FIG. 31, a key information selection circuit 2101 to select a key information K used to encrypt the input core row C, an amplitude controlling information code row encryption circuit 2102 to encrypt an amplitude controlling information code row CG by the key information K, a code row reconstruction circuit 2103 to provide a code row CR obtained by reconstructing the key information-encrypted amplitude controlling information code row CK and other code row C-CG into one code row, and a code row recording circuit 2104 to actually record the code row CR reconstructed by the core row reconstruction circuit 2103.

Figure 32:
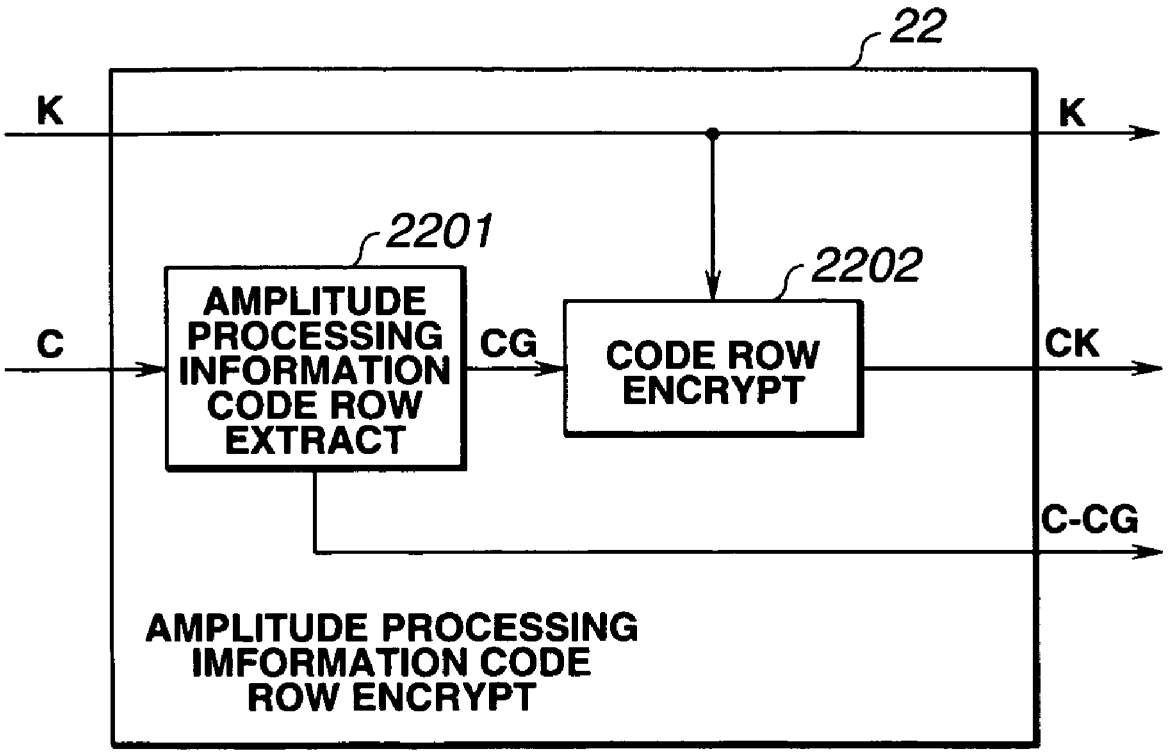
FIG. 32 is a block diagram of an amplitude controlling information code row encryption circuit.

The amplitude controlling information code row encryption circuit 2102 of the core row recorder 21 shown in FIG. 31 may be implemented as shown in FIG. 32. In FIG. 32, the amplitude controlling information core row encryption circuit is generally indicated with a reference 22.

The amplitude controlling information core row encryption circuit 22 comprises an amplitude controlling information code row extraction circuit 2201 to extract an amplitude controlling information from the code row C and provide other code row C-CG than the amplitude controlling information, and a code row encryption circuit 2202 to encrypt the code row based on the amplitude controlling information code row CG from the amplitude controlling information code row extraction circuit 2201 and supplied key information K and provide a key information-encrypted code row.

In the amplitude controlling information core row encryption circuit 22, the amplitude controlling information code row CG obtained by extracting only the amplitude controlling information from the code row C by the amplitude controlling information code row extraction circuit 2201 is encrypted by the key information K in the code row encryption circuit 2202. Thus, the amplitude controlling information core row encryption circuit 22 provides the key information K, key information-encrypted amplitude controlling information code row CK, and other code row C-CG.

Figure 33:
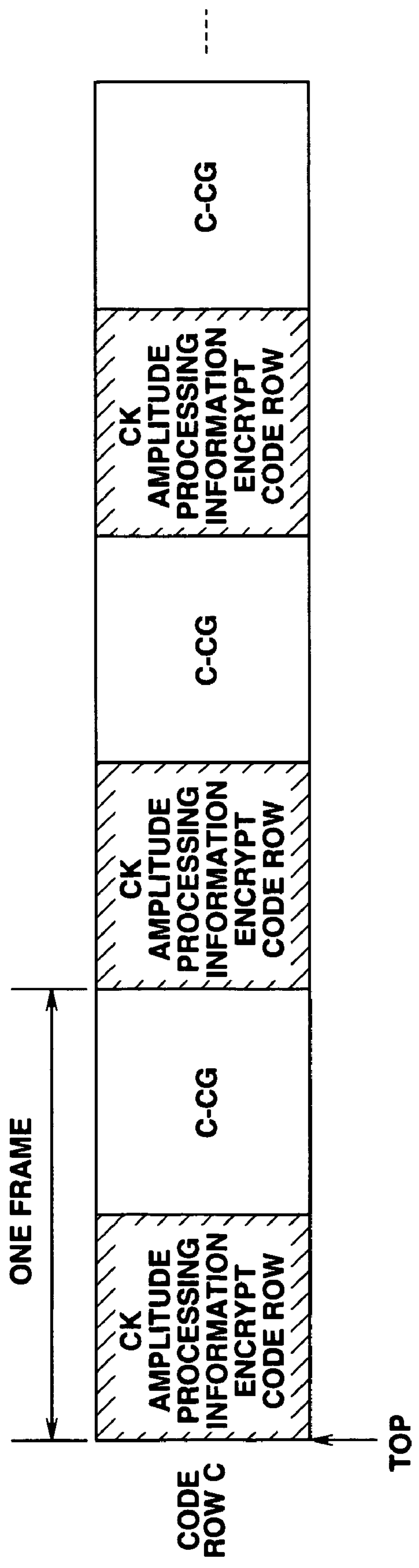
FIG. 33 shows a data configuration of a code row.

The code row CR recorded or transmitted by the code row recorder 21 has recorded at the code row top in each frame thereof an amplitude controlling information code row as shown in FIG. 33. Owing to this recording, the decoder can judge, just by checking the top of a code row, whether the code row has been encrypted or not. Of course, there is no problem if an amplitude controlling information code row is recorded anywhere other than the top of the code row.

Figure 34:
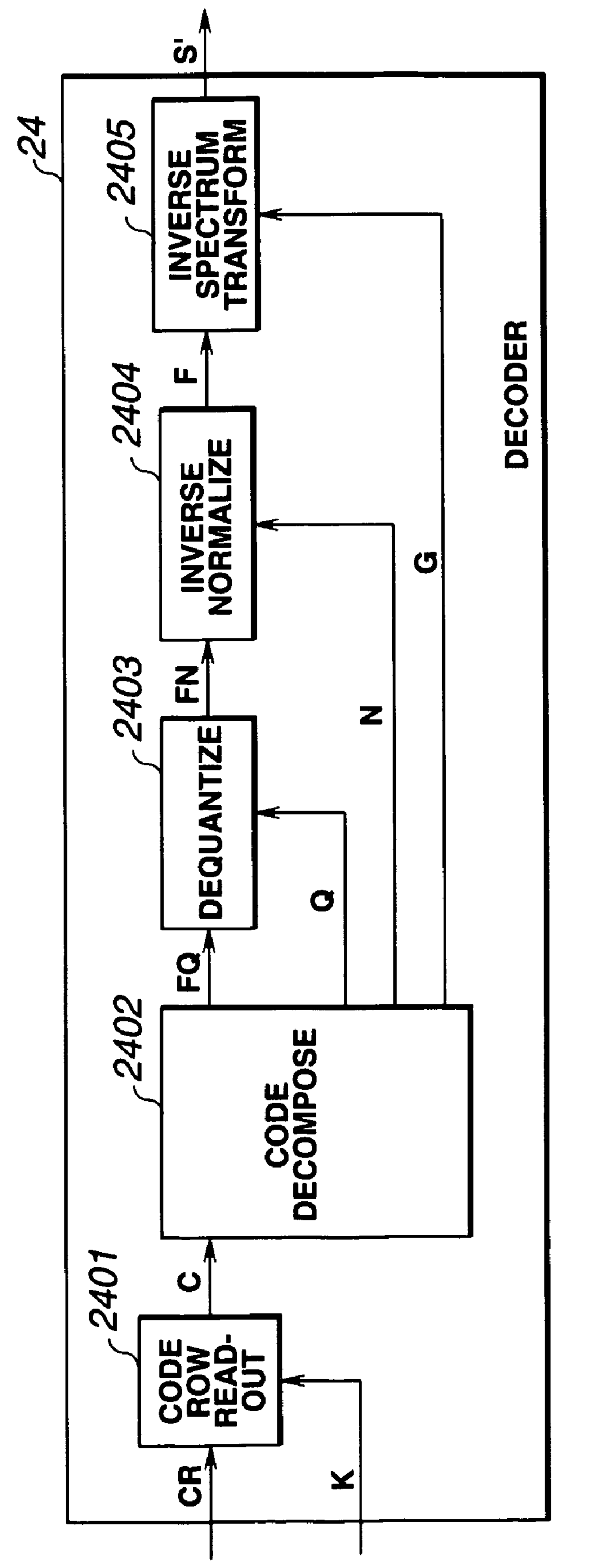
FIG. 34 is a block diagram of a variant of the decoder according to the present invention.

Referring now to FIG. 34, there is illustrated in the form of a block diagram a variant of the decoder according to the present invention. The decoder is generally indicated with a reference 24. The decoder 24 is adapted to restore the code row CR recorded or transmitted by the code row recorder 21. The decoder 24 comprises, as shown in FIG. 34, a code row read-out circuit 2401 to acquire the recorded or transmitted code row CR into the decoder, a code row decomposition circuit 2402 to decompose the code row C, a dequantizer 2403 to dequantize the decomposed code row C based on the quantized spectrum FQ and quantization information Q, an inverse normalization circuit 2404 to inversely normalize the dequantized spectrum FQ, and an inverse spectrum transformation circuit 2405 to combine the inversely normalized spectrum F with the restored signal S'.

The code row read-out circuit 2401 reads out a code row based on the code row CR from the recording medium or communications network and key information K to provide the code row C.

The code row decomposition circuit 2402 decomposes the code row C to provide the quantized spectrum FQ, quantization information Q, normalization information N and amplitude controlling information G.

The dequantization circuit 2403 dequantizes the decomposed code row C based on the quantized spectrum FQ and quantization information Q to provide the normalized spectrum FN.

The inverse normalization circuit 2404 inversely normalizes the dequantized code row C based on the normalized spectrum FN and normalization information N to provide the spectrum F.

The inverse spectrum transformation circuit 2405 inversely transforms the inversely normalized code row C based on the spectrum F and amplitude controlling information G to provide the time domain signal S'.

Figure 35:
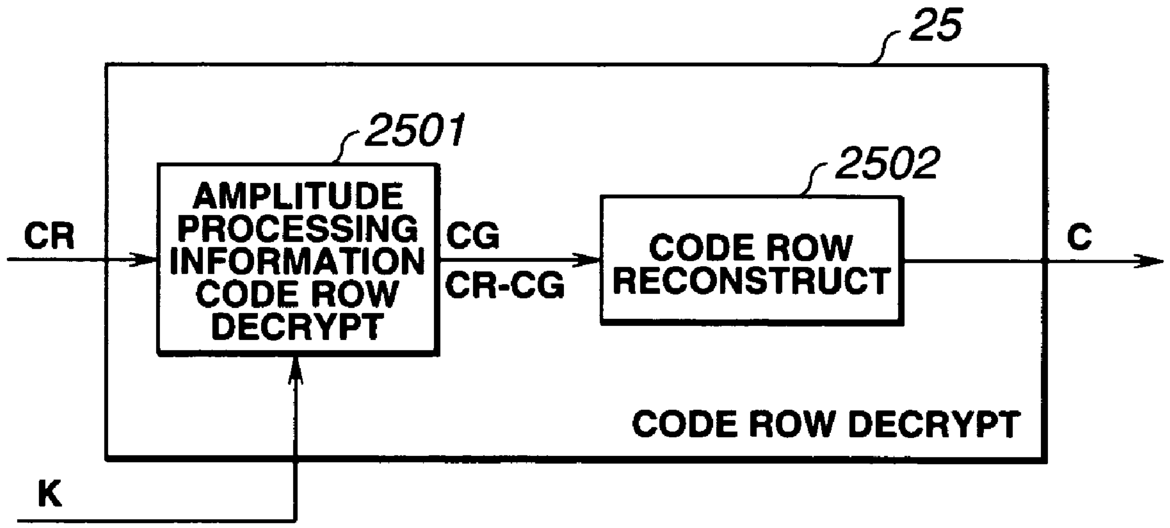
FIG. 35 is a block diagram of a code row read-out circuit.

The code row read-out circuit 2401 of the decoder 24 shown in FIG. 34 may be implemented like an code row read-out circuit 25 as shown in FIG. 35.

The code row read-out circuit 25 comprises an amplitude controlling information code row decryption circuit 2501 to decrypt the amplitude controlling information-encrypted code row CK encrypted to the code row CR and recorded to provided the amplitude controlling information CG, and a code row reconstruction circuit 2502 to reconstruct the code row C.

The code row CR supplied from the recording medium or transmitted by communications is decrypted by the amplitude controlling information decryption circuit 2501 to the amplitude controlling information CG by the separately supplied key information K, and then reconstructed to the code row C by the code row reconstruction circuit 2502.

Figure 36:
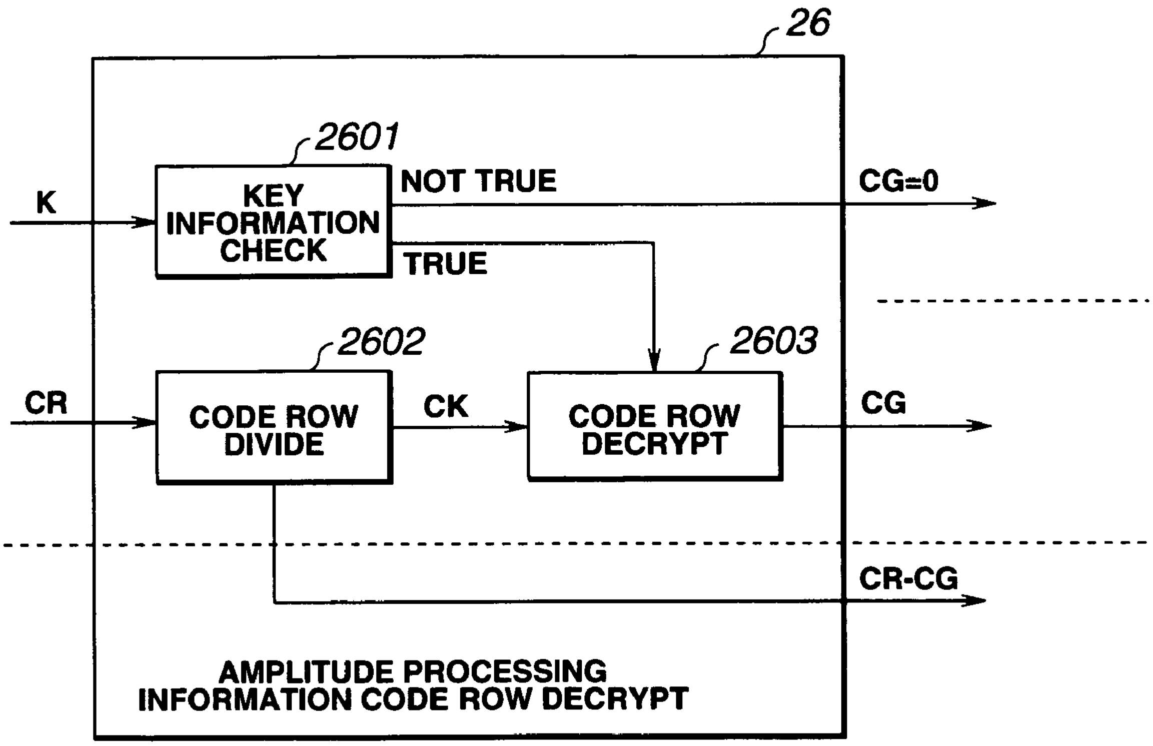
FIG. 36 is a block diagram of amplitude controlling information code row decryption circuit.

The amplitude controlling information code row decryption circuit 2501 provided in the code row read-out circuit 25 shown in FIG. 35 may be implemented like an amplitude controlling information code row decryption circuit 26 as shown in FIG. 36.

The amplitude controlling information code row decryption circuit 26 comprises, as shown in FIG. 36, a key information checking circuit 2601 for checking a separately supplied key information K to supply it to a code row decryption circuit 2603, which will appear later, when the key information K is true, and to provide CG=0 (which means that there exists no amplitude controlling information) when the key information K is not true, a code row divider 2602 for dividing an input code row to provide an encrypted code row CK and other code row CR-CG than any amplitude controlling information, and a code row decryption circuit 2603 to receive an encrypted code row CK from the code row divider 2601 and information from the key information checking circuit 2601 and provide an amplitude controlling information CG.

In the amplitude controlling information code row decryption circuit 26, first the code row divider 2602 divides the code row CR into the encrypted amplitude controlling information CK and other code row CR-CG. For the code row decryption circuit 2603 to decrypt the encrypted amplitude controlling information code row CK, the same key information K as having been used for encryption of the amplitude controlling information code row CK is necessary. To get the key information K, it is necessary to obtain permission from the author of the code row in consideration.

The key information checking circuit 2601 checks the supplied key information K. When the key information is equal to the encrypted key information K, the code row decryption circuit 2603 decrypts the encrypted key information K to get the amplitude controlling information code row CG. If the supplied key information is not equal to the encrypted key information K, the amplitude controlling information is provided as zero. Thus, the decoder cannot provide any correct decoding, so that a signal thus decoded will be greatly different in amplitude from the original signal.

Figure 37:
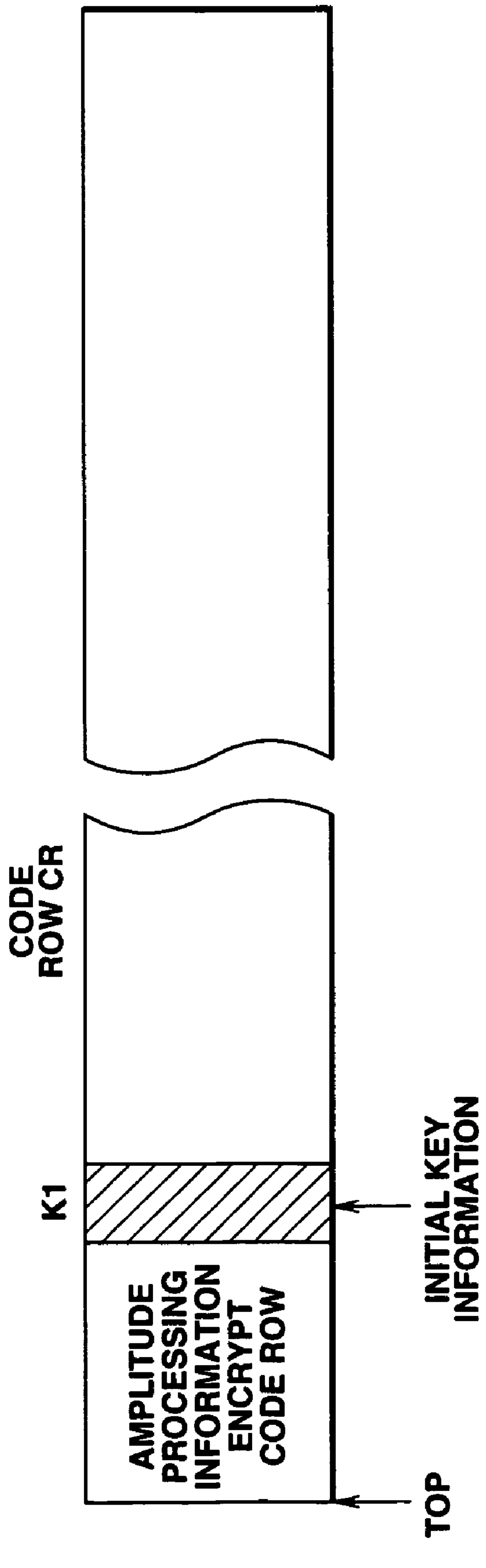
FIG. 37 explains initial key information included in the code row.

The code row CR may have previously buried therein an initial key information KI required for the decryption as shown in FIG. 37. In the code row CR, a top amplitude controlling information code row is followed by an initial key information KI as shown in FIG. 37.

Figure 38:
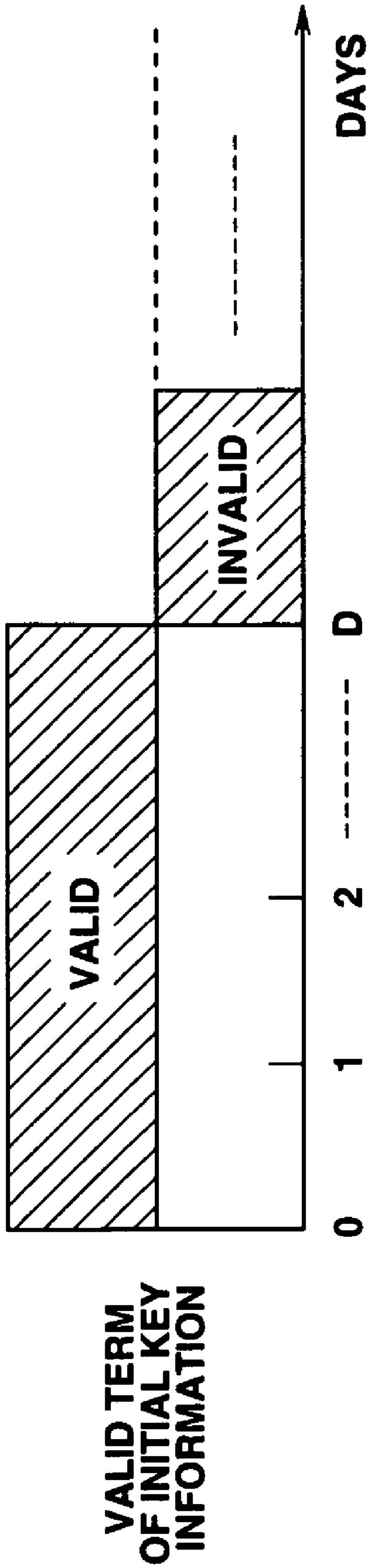
FIG. 38 explains a valid period of the initial key information.

Also, the recorder and decoder may be configured such that even if no key information is available to the decoder as shown in FIG. 38, an encrypted code row can be decrypted without the key information for a predetermined period D but cannot after lapse of the period D. This function is applicable to the initial key information KI. By disenabling the use of the initial key information KI after lapse of the predetermined period D, no correct decoding can be made possible.

The above is intended, for example, to an data service system in which listening to a recorded music free of charge is permitted only for the predetermined period D but the music cannot correctly be decoded without payment of a fee after lapse of the period D. Namely, after the period D, listening is allowed to only a low-quality music.

Thus, since the present invention can be used for an application that the encryption of only an amplitude controlling information allows to know what music data is recorded in a code row but makes it impossible to actually enjoy the data as a music, it can be used as a copyright protection or accounting system.

Next, the recording medium according to the present invention will be described herebelow:

According to one embodiment of recording medium according to the present invention, a recording medium is provided which has recorded therein an acoustic signal coding program adapted to code a time domain signal and comprising the processes of dividing the time domain signal into a plurality of frequency bands; detecting an amplitude of the time domain signal in each of the plurality of frequency bands in units of sub-block length resulted from division of a block length in which the time domain signal is to be coded; controlling the amplitude of the time domain signal based on the amplitude controlling information of at least one frequency band detected at the amplitude detecting step; transforming to a frequency component the time domain signal whose amplitude has been processed at the amplitude controlling step; and normalizing and/or quantizing the frequency component supplied from the frequency component transforming step.

According to another embodiment of recording medium according to the present invention, there is provided a recording medium having recorded therein an acoustic signal decoding program adapted to process, for a length of each of a plurality of sub-blocks resulted from division of a block length in which a time domain signal has been coded, the amplitude of the time domain signal based on the amplitude controlling information of each of frequency bands into which the time domain signal is divided, then transform the time domain signal to frequency components, code and/or quantize each of the frequency components to provide a row of codes and to decode this code row, the program comprising the processes of decomposing the code row; dequantizing and/or inversely normalizing the signal from the decomposing step to provide frequency components; combining the frequency components from the dequantizing and/or inversely normalizing step into the time domain signal; and controlling the amplitude of the time domain signal for a length of each of sub-blocks resulted from division of a block length in which the time domain signal combined at the combining step has been coded.

The recording medium according to a still another embodiment of the present invention has recorded a code row in which a time domain signal has been coded by an acoustic signal coding method adapted to code the time domain signal and comprising the steps of dividing the time domain signal into a plurality of frequency bands; detecting an amplitude of the time domain signal in each of the plurality of frequency bands in units of sub-block length resulted from division of a block length in which the time domain signal is to be coded; controlling the amplitude of the time domain signal based on the amplitude controlling information of at least one frequency band detected at the amplitude detecting step;

transforming to a frequency component the time domain signal whose amplitude has been processed at the amplitude controlling step; and normalizing and/or quantizing the frequency component supplied from the frequency component transforming step.

The above recording media of the present invention is provided as a disc medium such as so-called CD-ROM, etc. for example. Also, they may be provided as a multimedia communications network for example.

As having been described in the foregoing, the present invention effectively inhibits diffusion of a time domain signal of a special frequency component which develops locally in a transformed frame by dividing the input signal into a plurality of frequency bands for analysis and processing the signal amplitude.

According to the present invention, a signal can be coded with a high efficiency and accuracy by processing the signal amplitude in a block. More particularly, an original signal is divided into frequency bands for appropriate amplitude controlling, whereby the signal can be coded with a high efficiency and accuracy.

What is claimed is:

1. An acoustic signal apparatus including an encoder and a decoder each having a processor and a memory with the apparatus being configured to perform an acoustic signal coding and decoding method adapted to encode and decode a time domain signal, the method comprising the steps of:

dividing the time domain signal into a plurality of frequency bands by a subband filter in the encoder;

detecting an amplitude of the time domain signal in each of the plurality of frequency bands in units of sub-block length resulted from division of a block length in which the time domain signal is to be coded by an amplitude analyzer in the encoder;

controlling the amplitude of the time domain signal based on amplitude controlling information of at least one selected frequency band of the frequency bands detected during the amplitude detecting step by a normalization unit in the encoder;

transforming to a frequency component the time domain signal for which the amplitude was processed during the amplitude controlling step;

encoding the transformed time domain signal, the amplitude controlling information and an encoding key information into a code row by a encryption unit in the encoder;

sending the code row to the decoder by the encoder;

determining whether a time parameter exceeds predetermined period information by the decoder;

decoding the code row based on the time parameter determining step by the decoder;

comparing a supplied key information to the encoded key information by a key information checking unit in the decoder;

determining whether the supplied key information is equal to the encoded key information by a key information checking unit in the decoder; and based on the supplied key determining step generating an acoustic signal with the incorrect amplitude by the amplitude processor.

2. An acoustic signal apparatus including an encoder and a decoder each having a processor and a memory, the apparatus being adapted to code and decode a time domain signal, comprising:

means for dividing the time domain signal into a plurality of frequency bands using a subband filter;

means for detecting an amplitude of the time domain signal in each of the plurality of frequency bands in units of sub-block length resulted from division of a block length in which the time domain signal is to be coded;

means for controlling the amplitude of the time domain signal based on amplitude controlling information of at least one selected frequency band of the frequency bands detected by the amplitude detecting means;

means for transforming to a frequency component the time domain signal whose amplitude has been processed by the amplitude controlling means; and means for at least one of normalizing and quantizing the frequency component from the frequency component transforming means;

means for encoding the transformed time domain signal, the amplitude controlling information and an encoding key information into a code row;

means for sending the code row to the decoder;

means for determining whether a time parameter exceeds a predetermined period information;

means for decoding the code row;

means for comparing a supplied key information to the encoded key information; and means for determining whether the supplied key information is equal to the encoded key information;

means generating an acoustic signal with the incorrect amplitude when the supplied key information is not equal to the encoded key information based on the supplied key information.

3. An acoustic signal apparatus including an encoder and a decoder each having a processor and a memory, the apparatus being configured to perform an acoustic signal decoding method adapted to process, for a length of each of a plurality of subblocks resulted from division of a block length in which a time domain signal has been coded, the amplitude of the time domain signal based on amplitude controlling information of each frequency band of the frequency bands into which the time domain signal is divided, then transform the time domain signal to frequency components, code and/or quantize each of the frequency components to provide a row of codes, to decode the code row, the method comprising the steps of:

receiving an encoded code row from the encoder;

determining whether a time parameter exceeds a predetermined period information using the decoder;

decoding the encoded code row with the decoder by:

(i) decomposing the code row;

(ii) dequantizing and/or inversely normalizing a signal from the decomposing step to provide frequency components;

(iii) combining the frequency components from the dequantizing and/or inversely normalizing step into the time domain signal, and (iv) controlling the amplitude of the time domain signal for a length of each sub-block resulting from division of a block length in which the time domain signals combined during the combining step have been coded;

comparing a supplied key information to the encoded key information by a key information checking unit in the decoder;

determining whether the supplied key information is equal to the encoded key information by a key information checking unit in the decoder;

based on the supplied key determining step, generating an acoustic signal with the incorrect amplitude by the amplitude processor wherein, during the combining step, the time domain signal is obtained by inverse spectrum transformation of each of the frequency components, during the amplitude controlling step, the time domain signal is subjected to inverse amplitude controlling to restore the time domain signal including all the band signals divided in bands by the subband filter.

4. An acoustic signal apparatus including an encoder and an acoustic signal decoder each having a processor and a memory, the apparatus adapted to process, for a length of each of a plurality of sub-blocks resulted from division of a block length within which a time domain signal has been coded, the amplitude of the time domain signal based on the amplitude controlling information of each frequency band of the frequency bands into which the time domain signal is divided, then transform the time domain signal to frequency components, code and/or quantize each of the frequency components to provide a row of codes and to decode the code row, comprising:

means for receiving the encoded code row from the encoder;

means for determining whether a time parameter exceeds a predetermined period information;

means for comparing a supplied key information to the encoded key information; and means for determining whether the supplied key information is equal to the encoded key information;

means for generating, based on the supplied key determining step, an acoustic signal with the incorrect amplitude;

means for dequantizing and/or inversely normalizing the signal, supplied from the decomposing means, to provide frequency components;

means for at least one of combining the frequency components supplied from the dequantizing and inversely normalizing means into the time domain signal; and means for controlling the amplitude of the time domain signal to an incorrect level for a length of each sub-block resulting from division of a block length in which the time domain signals combined by the combining means have been coded when the supplied key information is not equal to the encoded key information based on the supplied key information.

5. An acoustic signal apparatus including an encoder, a decoder, and a recording medium having recorded therein an acoustic signal coding program that when executed cause the encoder to code and the decoder to decode a time domain signal by performing the processes of:

dividing the time domain signal into a plurality of frequency bands using a subband filter by the encoder;

detecting an amplitude of the time domain signal in each of the plurality of frequency bands in units of sub-block length resulted from division of a block length in which the time domain signal is to be coded by an amplitude analyzer in the encoder;

controlling the amplitude of the time domain signal based on the amplitude controlling information of at least one selected frequency band of the frequency bands detected during the amplitude detecting step by the normalization unit in the encoder;

transforming to a frequency component the time domain signal whose amplitude has been processed during the amplitude controlling step; and at least one of normalizing and quantizing the frequency component supplied from the frequency component transforming step;

encoding the transformed time domain signal, the amplitude controlling information and an encoding key information into a code row by a encryption unit in the encoder;

sending the code row to the decoder by the encoder;

determining whether a time parameter exceeds a predetermined period information by the decoder;

decoding the code row based on the time parameter determining step by the decoder;

comparing a supplied key information to the encoded key information by a key information checking unit in the decoder;

determining whether the supplied key information is equal to the encoded key information by a key information checking unit in the decoder; and based on the supplied key determining step generating an acoustic signal with the incorrect amplitude by the amplitude processor when the supplied key information is not equal to the encoded key information based on the supplied key determining step using the decoder.

* * * * *